(12) United States Patent
Sugitani et al.

(10) Patent No.: US 12,358,076 B2
(45) Date of Patent: Jul. 15, 2025

(54) LAMINATING AND SHAPING COPPER POWDER, LAMINATED AND SHAPED OBJECT, MANUFACTURING METHOD OF LAMINATED AND SHAPED OBJECT, AND LAMINATING AND SHAPING APPARATUS

(71) Applicants: FUKUDA METAL FOIL & POWDER CO., LTD., Kyoto (JP); TECHNOLOGY RESEARCH ASSOCIATION FOR FUTURE ADDITIVE MANUFACTURING, Tokyo (JP)

(72) Inventors: Yuji Sugitani, Kyoto (JP); Hideki Kyogoku, Hiroshima (JP)

(73) Assignees: FUKUDA METAL FOIL & POWDER CO., LTD., Kyoto (JP); TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 207 days.

(21) Appl. No.: 17/607,736

(22) PCT Filed: Jun. 4, 2020

(86) PCT No.: PCT/JP2020/022203
§ 371 (c)(1),
(2) Date: Oct. 29, 2021

(87) PCT Pub. No.: WO2020/250811
PCT Pub. Date: Dec. 17, 2020

(65) Prior Publication Data
US 2022/0219232 A1    Jul. 14, 2022

(30) Foreign Application Priority Data

Jun. 13, 2019  (JP) .................................. 2019-110429

(51) Int. Cl.
*B23K 26/342* (2014.01)
*B22F 1/00* (2022.01)
(Continued)

(52) U.S. Cl.
CPC .............. *B23K 26/342* (2015.10); *B22F 1/00* (2013.01); *B22F 1/05* (2022.01); *B22F 1/105* (2022.01);
(Continued)

(58) Field of Classification Search
None
See application file for complete search history.

(56) References Cited

FOREIGN PATENT DOCUMENTS

| EP | 3112056 A1 | 1/2017 |
|----|-----------|--------|
| EP | 3187285 A1 | 7/2017 |

(Continued)

OTHER PUBLICATIONS

Extended European Search Report issued on Jun. 21, 2022 for Application No. EP 20822132.5.
(Continued)

*Primary Examiner* — Daniel J. Schleis
(74) *Attorney, Agent, or Firm* — LADAS & PARRY LLP

(57) ABSTRACT

The present invention provides a laminating and shaping copper powder capable of shaping a laminated and shaped object of copper having a high electrical conductivity of, for example, 80% IACS or more. The present invention is a laminating and shaping copper powder obtained by mixing a nano-oxide of equal to or more than 0.01 wt % and equal to or less than 0.20 wt % and a pure copper powder. There is also provided a laminated and shaped object using the laminating and shaping copper powder of the present invention. There are also provided a manufacturing method of the laminated and shaped object using the laminating and shaping copper powder of the present invention and a laminating and shaping apparatus using the laminating and shaping copper powder.

3 Claims, 21 Drawing Sheets

(51) Int. Cl.
| | |
|---|---|
| B22F 1/05 | (2022.01) |
| B22F 1/105 | (2022.01) |
| B22F 1/12 | (2022.01) |
| B22F 10/28 | (2021.01) |
| B33Y 10/00 | (2015.01) |
| B33Y 30/00 | (2015.01) |
| B33Y 70/00 | (2020.01) |
| B23K 103/12 | (2006.01) |
| B33Y 80/00 | (2015.01) |

(52) U.S. Cl.
CPC ............... *B22F 1/12* (2022.01); *B22F 10/28* (2021.01); *B33Y 10/00* (2014.12); *B33Y 30/00* (2014.12); *B33Y 70/00* (2014.12); *B22F 2301/10* (2013.01); *B22F 2302/25* (2013.01); *B22F 2304/10* (2013.01); *B23K 2103/12* (2018.08); *B33Y 80/00* (2014.12)

(56) References Cited

FOREIGN PATENT DOCUMENTS

| | | | |
|---|---|---|---|
| JP | 2004332016 A | | 11/2004 |
| JP | 2009203543 A | * | 9/2008 |
| JP | 2016041850 A | | 3/2016 |
| JP | 2016078097 A | | 5/2016 |
| JP | 6303016 B2 | | 3/2018 |
| JP | 2018-154850 A | | 10/2018 |
| JP | 2018-197389 A | | 12/2018 |
| WO | 2015194678 A1 | | 12/2015 |
| WO | 2017217302 A1 | | 12/2017 |
| WO | 2019017467 A1 | | 1/2019 |
| WO | 2019064745 A1 | | 4/2019 |

OTHER PUBLICATIONS

International Search Report with English translation and Written Opinion dated Aug. 18, 2020 for Application No. PCT/JP2020/022203.
Tadashi Mizoguchi, "Fundamentals of Materials Science, Solid State Physics", p. 126-128, Apr. 1989, published by Shokabo.
Chinese Office Action with an English translation issued on May 27, 2022 for Chinese Patent Application No. 202080040371. 6.
Japanese Official Action mailed Mar. 19, 2004 in counterpart Japanese Patent Application No. 2021-526057.
EP Office Action issued in corresponding EP Patent Application No. 20822132.5 on Apr. 12, 2024.
Peter Spiekermann: "Legierungen—ein besonderes patentrechtliches Problem?", Mitteilungen Der Deutschen Patentanwael Te, Heymann, Koln, DE, vol. 34, Jan. 1, 1993 (Jan. 1, 1993), pp. 178-190, XP002152326, ISSN: 0026-6884.
Decision to Grant for corresponding JP Patent Application No. JP2021-526057 mailed on Aug. 20, 2024.

* cited by examiner

LAMINATING AND SHAPING COPPER POWDER, LAMINATED AND SHAPED OBJECT, MANUFACTURING METHOD OF LAMINATED AND SHAPED OBJECT, AND LAMINATING AND SHAPING APPARATUS

RELATED APPLICATION

This application is an application under 35 U.S.C. 371 of International Application No. PCT/JP2020/022203 filed on Jun. 4, 2020 which is based upon and claims the benefit of priority from Japanese patent application No. 2019-110429, filed on Jun. 13, 2019, the disclosures of each of which are incorporated in their entirety by reference.

TECHNICAL FIELD

The present invention relates to laminating and shaping using a copper powder.

BACKGROUND ART

In the above technical field, since high electrical conductivity of copper makes energy necessary for melting high or surface reflection of a beam strong, it is difficult to stably perform laminating and shaping under the present circumstances. Patent literature 1 discloses a technique of improving flow rate or diffusion characteristic of a metal powder in an additive manufacturing technique (3D printing technique) by forming a layer of nano-silica ($SiO_2$) in an amount less than 100 ppm as a treating agent on a surface of Inconel® 718 that is a nickel alloy. Patent literature 2 discloses a technique of improving flow rate using, as a laminating and shaping powder, a mixture of a metal powder made of an alloy of Al, Co, Cr, Fe, Ni, or the like and having an average diameter of equal to or more than 10 μm and equal to or less than 200 μm and a ceramic, silica, or alumina powder having a sphericity higher than that of the metal powder, an average diameter 1/10 or smaller than that of the metal powder, and a volume fraction of equal to or more than 0.001% and equal to or less than 1% of that of the metal powder.

CITATION LIST

Patent Literature

Patent literature 1: Japanese Patent Laid-Open No. 2016-041850
Patent literature 2: Japanese Patent No. 6303016

Non-Patent Literature

Non-patent literature 1: Tadashi Mizoguchi, "Fundamentals of Materials Science, Solid State Physics", P. 126-128, April 1989, published by Shokabo

SUMMARY OF THE INVENTION

Technical Problem

However, the techniques described in the above literatures are techniques aiming at improving the flow rate of the laminating and shaping copper powder, and its electrical conductivity is not taken into consideration. Hence, according to these disclosed techniques, it is impossible to provide a laminating and shaping copper powder necessary for shaping a laminated and shaped object that is useful as a laminated and shaped object of copper and has a high electrical conductivity (for example, 80% IACS or more).

The present invention enables to provide a technique of solving the above-described problem.

Solution to Problem

One example aspect of the invention provides a laminating and shaping copper powder, in which a pure copper powder and a nano-oxide of equal to or more than 0.01 wt % and equal to or less than 0.20 wt % are mixed.

Another example aspect of the invention provides a laminated and shaped object which is laminated and shaped using a laminating and shaping copper powder according to the claims, wherein the laminated and shaped object contains a nano-oxide of equal to or more than 0.01 wt % and equal to or less than 0.20 wt %, and an electrical conductivity of the laminated and shaped object is not less than 80% IACS.

Still other example aspect of the invention provides a manufacturing method of a laminated and shaped object using a laminating and shaping copper powder according to the claims, comprising:
    forming a powder bed by spreading the laminating and shaping copper powder layer by layer; and
    shaping a laminated and shaped object of at least one layer by irradiating the laminating and shaping copper powder spread in the at least one layer with a laser beam while scanning the laser beam such that a laser power becomes not more than 1 kW, and an energy density becomes equal to or more than 500 J/mm³ and equal to or less than 1,500 J/mm³.

Still other example aspect of the invention provides a laminating and shaping apparatus comprising:
    a determiner that determines that an average particle diameter of a pure copper powder is equal to or more than 5 μm and equal to or less than 15 μm, and a powder resistance value of a laminating and shaping copper powder containing the pure copper powder is equal to or more than (7.50E+5) Ω and equal to or less than (2.50E+7) Ω; and
    a laminating and shaping unit that shapes a laminated and shaped object using the laminating and shaping copper powder if it is determined by the determiner that both the average particle diameter and the powder resistance value fall within said ranges of the average particle diameter and the powder resistance value.

Advantageous Effects of Invention

According to the present invention, it is possible to provide a laminating and shaping copper powder capable of shaping a laminated and shaped object of copper having a high electrical conductivity.

DESCRIPTION OF EXAMPLE EMBODIMENTS

Figure 1:
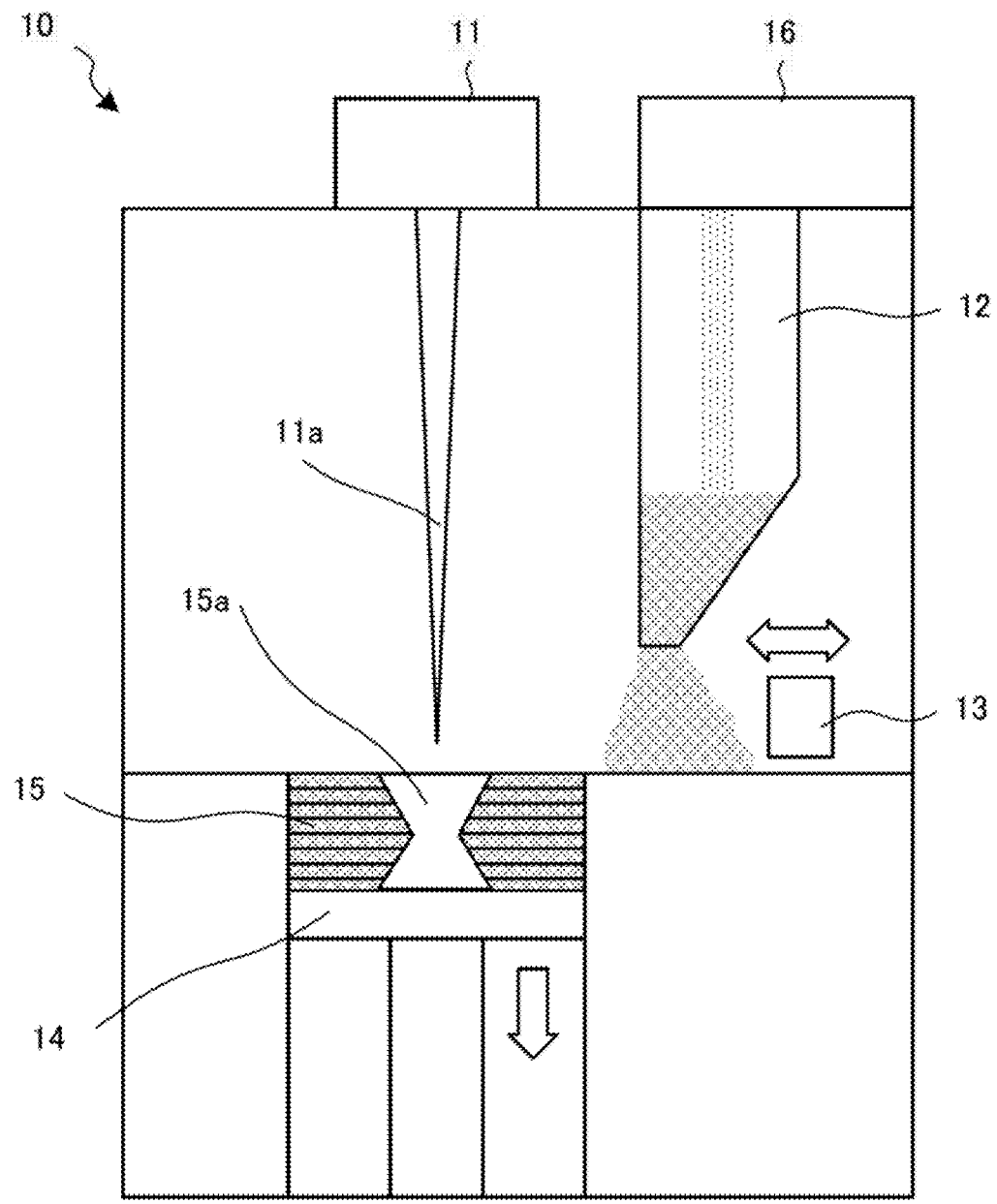
FIG. 1 is a view showing an example of the configuration of a laminating and shaping apparatus according to the example embodiment of the present invention.

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

<<Application Purpose of Laminated and Shaped Object Laminated and Shaped Using Pure Copper Powder According to this Example Embodiment>>

A pure copper powder used in this example embodiment is used as a material for laminating and shaping an object. If a laminated and shaped object using a pure copper powder can be created, fine shaping in the fields of a connector of an electric circuit, a heat sink, a heat exchanger, and the like is possible.

In such an application purpose, the laminated and shaped object using the pure copper powder preferably has a sufficient density (a measurement density by the Archimedes method is 98.5% or more). If the measurement density is less than 98.5%, a problem such as water leakage arises. To use the electrical conductivity or thermal conductivity of copper, a pure copper product preferably has a sufficient electrical conductivity (80% IACS or more). Note that the laminated and shaped object using the pure copper powder is not limited to the above-described examples, and may be used as a circuit component or an electromagnetic wave shield component.

<<Laminating and Shaping Copper Powder>>

Generally, in metal laminating and shaping, a fiber laser is used as a heat source in laser beam laminating and shaping, and a metal powder is molten and coagulated, thereby forming an arbitrary shape. In this case, although a high-density shaped object can be obtained using a material with a low electrical conductivity, it is often impossible to obtain a high-density shaped object using a material with a high electrical conductivity. Copper is an element having a high electrical conductivity and thermal conductivity, and is expected to be able to produce an electric conductive component or a thermal conductive component having a complex shape using laser beam laminating and shaping. However, it is impossible to produce a high-density shaped object using a pure copper powder. This is because if a pure copper powder is used, since thermal energy diffuses in laser irradiation because of the high electrical conductivity, and the laser beam is reflected in laser irradiation, thermal energy necessary for melting the pure copper powder cannot be obtained.

Hence, for example, when a copper alloy powder containing tin (Sn) or a copper alloy powder containing phosphorus (P) is used to reduce the electrical conductivity, a laminated and shaped object having a sufficient density (a measurement density by the Archimedes method is 98.5% or more) can be manufactured. However, in the copper alloy powder containing tin (Sn) or the copper alloy powder containing phosphorus (P), the electrical conductivity of the laminated and shaped object is 50% IACS at most, and the electrical conductivity of the laminated and shaped object cannot be 80% IACS or more.

This example embodiment provides a laminating and shaping copper powder having an electrical conductivity lower than that of a pure copper powder and capable of being molten by an existing apparatus with an energy density of about 1,000 J/mm$^3$ and obtaining a pure copper laminated and shaped object having a high density and a high conductivity.

Conditions as a laminating and shaping copper powder according to this example embodiment will be summarized below.

(Conditions of Laminating and Shaping Copper Powder)
  (1) The laminating and shaping copper powder has an electrical conductivity lower than that of a pure copper powder. For example, the powder resistance value is preferably two or more times larger than the pure copper powder. When this condition is satisfied, it is possible to maintain a high temperature by impeding diffusion of heat and facilitate melting of the laminating and shaping copper powder. For example, the powder resistance value of the laminating and shaping copper powder containing a copper powder falls within the range of equal to or more than (7.50E+5) Ω and equal to or less than (2.50E+7) Ω.
  (2) The particle volume of the pure copper powder contained in the laminating and shaping copper powder is reduced (the particle diameter is made small). When this condition is satisfied, the energy amount necessary for melting one particle is reduced, and melting of the laminating and shaping copper powder is facilitated.
  (3) A powder bed can be formed from the laminating and shaping copper powder. For example, the flow rate (JIS Z2502/FR: flow rate) of the laminating and shaping copper powder falls within the range of equal to or more than 15 sec/50 g and equal to or less than 120 sec/50 g, and is preferably, 60 sec/50 g or less. Alternatively, the adhesion (FT4 measurement) of the laminating and shaping copper powder is 0.450 kPa or less. When this condition is satisfied, the laminating and shaping copper powder can be used as a metal powder for laminating and shaping by the powder bed method.
  (4) The content of the pure copper powder in the laminating and shaping copper powder is a predetermined amount or more. For example, the apparent density (JIS Z2504) of the laminating and shaping copper powder falls within the range of equal to or more than 4.0 g/cm$^3$ and equal to or less than 5.5 g/cm$^3$. When the apparent density of the copper powder is set within this range, the copper amount per unit volume is maintained at a predetermined amount in the powder bed, and the laminated and shaped object can have the characteristic of pure copper.

<<Manufacturing of Pure Copper Laminated and Shaped Object>>

FIG. 1 is a view showing an example of the schematic configuration of a laminating and shaping apparatus 10 according to this example embodiment. The laminating and shaping unit of the laminating and shaping apparatus 10 includes an emitting mechanism 11 of an electron beam or fiber laser 11a, a hopper 12 that is a powder tank, a squeegeeing blade 13 configured to form a powder bed by spreading a powder layer by layer to a predetermined thickness, and a table 14 that repetitively descends by a predetermined thickness for laminating. By cooperation of the squeegeeing blade 13 and the table 14, an even powder laminating layer 15 with a predetermined thickness is generated. Each layer is irradiated with the fiber laser 11a based on slice data obtained by 3D-CAD data to melt a metal powder (a copper powder in this example embodiment), thereby manufacturing a laminated and shaped object 15a. Also, a laminating and shaping powder determiner 16 determines whether the laminating and shaping powder is capable of laminating and shaping in the laminating and shaping apparatus 10. Note that in this example embodiment, it is determined that the average particle diameter of the copper powder falls within the range of 5 μm to 15 μm, and the powder resistance value of the laminating and shaping copper powder containing the copper powder falls within the range of equal to or more than (7.50E+5) Ω and equal to or less than (2.50E+7) Ω. If each determination result falls within the range, it is possible to generate a pure copper laminated and shaped object having a relative density of 99% or more and an electrical conductivity of 80% IACS or more by an energy density possible in the laminating and shaping apparatus 10.

Note that the used energy density E(J/mm$^3$) was adjusted by E=P/(v×s×t), where t: thickness of powder bed, P: laser power, v: scanning speed of laser, s: laser scanning pitch.

Conditions as a pure copper laminated and shaped object according to this example embodiment will be summarized below.

(Conditions as Pure Copper Laminated and Shaped Object)
  (5) The laminated and shaped object using the pure copper powder has a sufficient density. For example, the measurement density by the Archimedes method is 98.5% or more. When this condition is satisfied, the strength of the laminated and shaped object by pure copper can be obtained.
  (6) The laminated and shaped object using the pure copper powder has a sufficient electrical conductivity as a pure copper product. For example, the electrical conductivity is 80% IACS or more. When this condition is satisfied, the laminated and shaped object can be used as a laminated and shaped object having the characteristic of pure copper.

<<Laminating and Shaping Copper Powder According to this Example Embodiment>>

This example embodiment provides the following powder as a laminating and shaping copper powder that satisfies the above-described conditions, can be molten by an existing apparatus with a laser power of 1 kW or less and an energy density of about 1,000 J/mm$^3$, and can form a powder bed, which is a laminating and shaping copper powder that has a desired strength as a pure copper laminated and shaped object after laminating and shaping and has a sufficient electrical conductivity.
  (1) A nano-oxide of 0.01 wt % to 0.20 wt % (100 ppm to 2,000 ppm) is mixed with the pure copper powder. If the mixture of the nano-oxide is less than 0.01 wt %, the electrical conductivity is high, and the energy amount necessary for melting cannot be provided by the existing apparatus. In particular, if the average particle diameter of the pure copper powder is 10 μm or less, and the mixture of the nano-oxide is less than 0.01 wt %, formation of the powder bed fails. On the other hand, if the mixture of the nano-oxide is 0.20 wt % or more, a pure copper shaped object having a high density and a high conductivity cannot be obtained. Note that the mixture of the nano-oxide more preferably falls within the range of 0.01 wt % to 0.10 wt % (100 ppm to 1,000 ppm).

As the nano-oxide, a nano-oxide whose shape is spherical or close to a true sphere and whose primary average particle diameter falls within the range of 10 nm to 100 nm, and is more particularly 50 nm or less is suitably used. Examples of the nano-oxide include nano-copper oxide (CuO), nano-alumina ($Al_2O_3$), nano-titania ($TiO_2$), and nano-yttria ($Y_2O_3$), and the like, in addition to nano-silica ($SiO_2$), as shown in Table 1 below.

TABLE 1

| | Physical Value | | | Standard Value | |
|---|---|---|---|---|---|
| Nano-Oxide | Bulk Density (g/ml) | True Density (g/ml, 20° C.) | Partical Shape | Specific Surface Area SSA ($m^3/g$) | Average Particle Diameter ($D_{BET}$) |
| $Al_2O_3$ | 0.23 | 3.6 | true sphere | 35.0-75.0 | 22.2-47.7 |
| CuO | 0.21 | 6.3 | spherical | 10.0-35.0 | 27.2-95.3 |
| $SiO_2$ | 0.05 | 2.2 | true sphere | 33.7-152.0 | 18.8-83.6 |
| $TiO_2$ | 0.26 | 3.95 | true sphere | 15.0-77.0 | 19.7-101.0 |
| $Y_2O_3$ | 0.17 | 4.84 | spherical | 14.0-60.0 | 20.6-88.5 |

Quoted from the product list of "metal oxide nanoparticles" (KANTO CHEMICAL)

(2) The average particle diameter of the pure copper powder falls within the range of 5 μm to 15 μm. That is, in this example embodiment, the volume of one of metal particles of pure copper is reduced, thereby reducing the energy amount necessary for melting one particle. To allow the existing apparatus with an energy density of about 1,000 $J/mm^3$ to melt, for example, a pure copper powder having an average particle diameter is 20 μm or less is used.

Note that if the average particle diameter of the pure copper powder is less than 5 μm, even if the nano-oxide is mixed, a sufficient flow rate cannot be obtained, and formation of the powder bed for implementing laminating and shaping fails. Also, if the particle is made too small, the amount of the metal existing in the powder bed decreases (corresponding to a decrease in the apparent density). Hence, shaping cannot be performed because of the formation failure of the powder bed. It is therefore impossible to obtain a pure copper shaped object having a high density and a high conductivity. On the other hand, if the average particle diameter of the pure copper powder is 15 μm or more, a pure copper shaped object having a high density and a high conductivity cannot be obtained even if the powder bed can be formed. Note that it is more preferable that the average particle diameter of the pure copper powder falls within the range of 8 μm to 15 μm.

(Schematic View of Laminating and Shaping Copper Powder)

Figure 2:
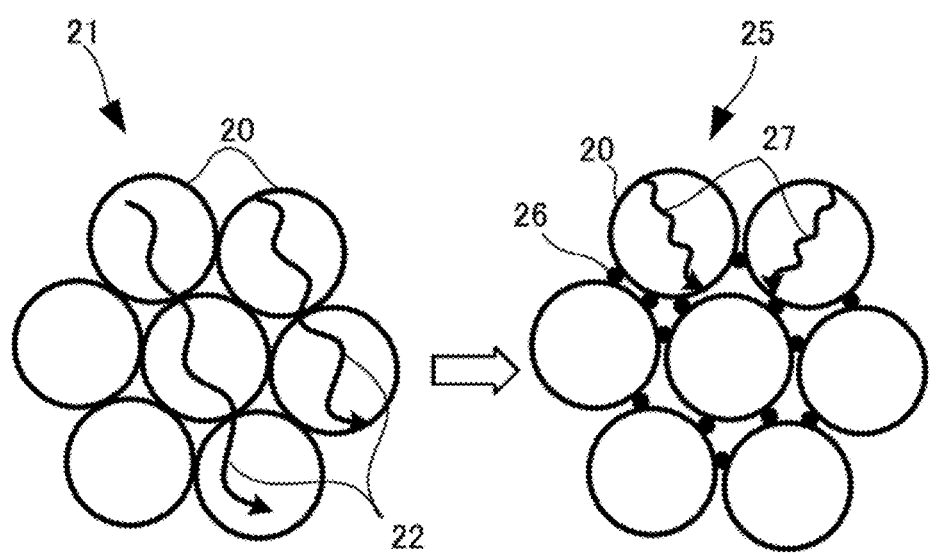
FIG. 2 is a view for explaining the mixed state of a pure copper powder and a nano-oxide according to the example embodiment of the present invention.

FIG. 2 is a schematic view for explaining the mixed state of the pure copper powder and the nano-oxide in the laminating and shaping copper powder according to this example embodiment. Note that in FIG. 2, the sizes of the pure copper powder and the nano-oxide are different from the actuality, and the nano-oxide is too small to be shown in FIG. 2.

A pure copper powder 21 has a high electrical conductivity and high thermal conductivity because pure copper particles 20 are in direct contact. As indicated by arrows 22, heat of a portion irradiated with a laser beam is thermally conducted and diffused via the adjacent pure copper particles 20. Hence, the existing apparatus with an energy density of about 1,000 $J/mm^3$ cannot accumulate heat and melt the powder until the portion irradiated with the laser beam exceeds the melting point.

On the other hand, in a laminating and shaping copper powder 25 according to this example embodiment, nano-oxides 26 are sandwiched between the pure copper particles 20, and the heat by the laser beam is accumulated in the pure copper particles 20, as indicated by arrows 27. Hence, the existing apparatus with an energy density of about 1,000 $J/mm^3$ can accumulate heat and melt the powder until the portion irradiated with the laser beam exceeds the melting point.

Note that in the laminating and shaping copper powder of the pure copper powder according to this example embodiment, it is known as the Wiedemann-Franz law in non-patent literature 1 or the like that reduction of the electrical conductivity is proportional to reduction of the thermal conductivity.

<<Measurement of Characteristics of Laminating and Shaping Copper Powder According to this Example Embodiment>>

The following characteristics were measured concerning a prepared laminating and shaping copper powder.

(Image Capturing of Surface)

The surface of a manufactured laminating and shaping copper powder was captured using an SEM (Scanning Electron Microscope).

(Measurement of 50% Particle Diameter)

Concerning the laminating and shaping copper powder, the 50% particle diameter (μm) was measured by a laser diffraction method (Microtrac MT3300: available from MicrotracBEL).

(Measurement of Adhesion)

Figure 6A:
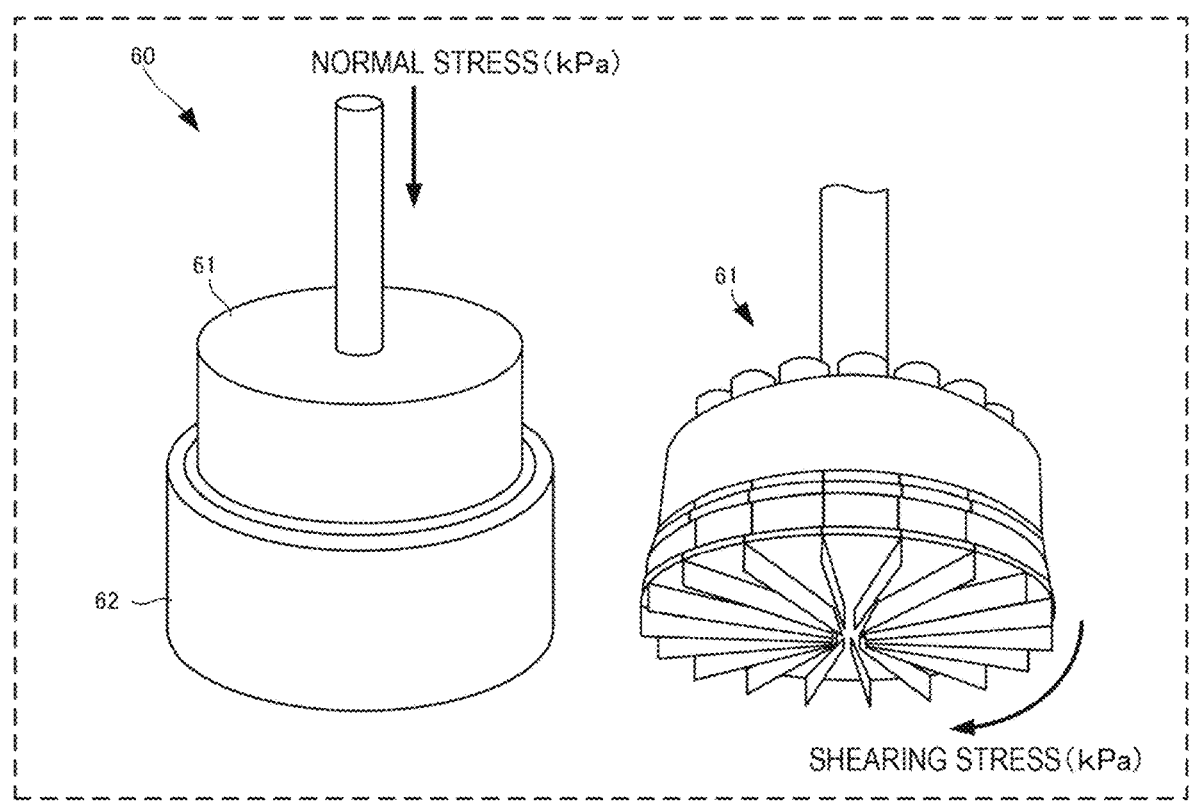
FIG. 6A is a view showing the configuration of a shearing stress measurer configured to measure shearing stress in the example embodiment of the present invention.

FIG. 6A is a view showing the configuration of a shearing stress measurer 60 configured to measure shearing stress in the example embodiment. The shearing stress measurer 60 measures shearing stress by a rotary cell method, places, inside an external cell 62, a rotary cell 61 with blades attached to the lower portion, and fills the upper portion of the external cell 62 with a powder to be measured. Shearing stress is measured from the rotation torque of the rotary cell 61 while applying predetermined normal stress from the rotary cell 61 to the external cell 62.

Figure 6B:
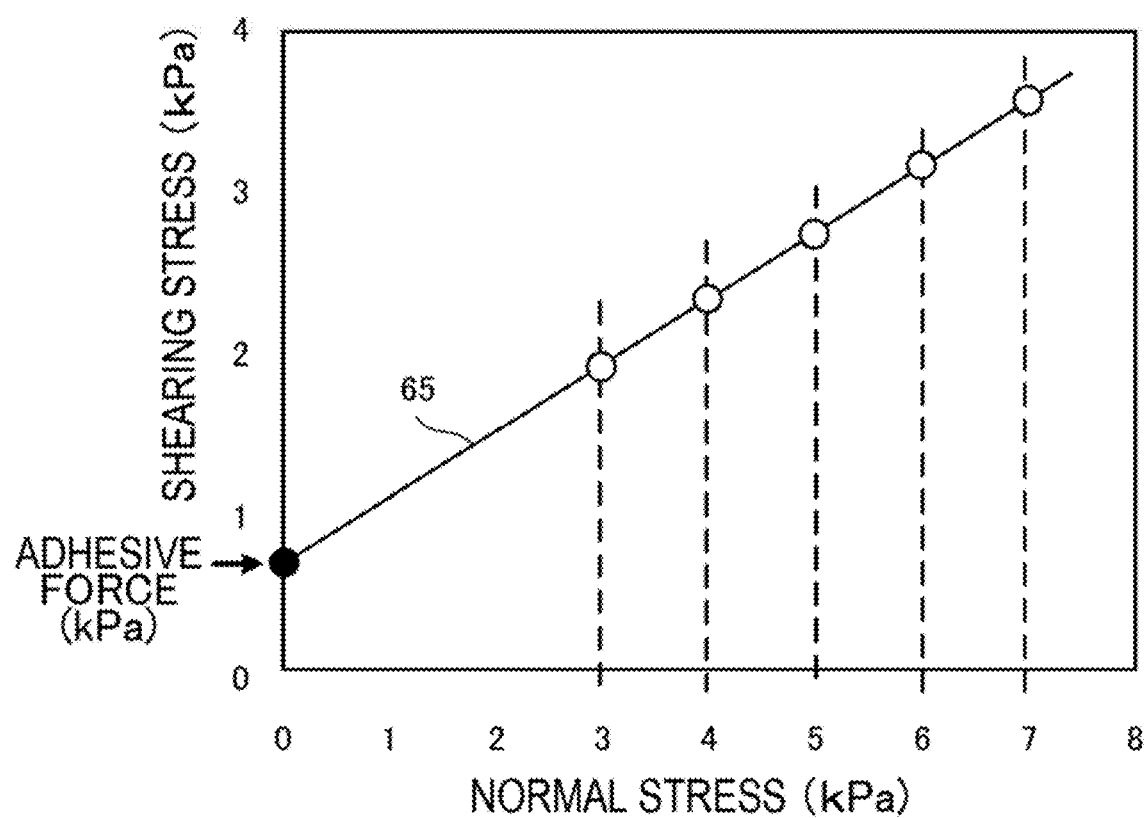
FIG. 6B is a view showing a method of obtaining an adhesion based on the shearing stress measured by the shearing stress measurer in the example embodiment of the present invention.

FIG. 6B is a view showing a method of obtaining an adhesion based on the shearing stress measured by the shearing stress measurer 60 in this example embodiment. As shown in FIG. 6B, a line obtained by plotting shearing stress measured by the shearing stress measurer 60 at the time of shearing occurrence under each normal stress will be referred to as a failure envelope. When shearing stress stronger than the failure envelope is applied, a slide occurs in the powder layer. On a failure envelope (for example, 65), shearing stress when the normal stress is 0 (zero) is obtained as the adhesive force between particles.
(Measurement of Apparent Density)

Concerning the laminating and shaping copper powder, an apparent density (g/cm$^3$) was measured based on JIS Z2504.
(Measurement of Flow Rate)

Concerning the laminating and shaping copper powder, a flow rate (see/50 g) was measured based on JIS Z2502.
(Measurement of Electrical Conductivity of Powder=1/Electrical Conductivity)

Figure 3A:
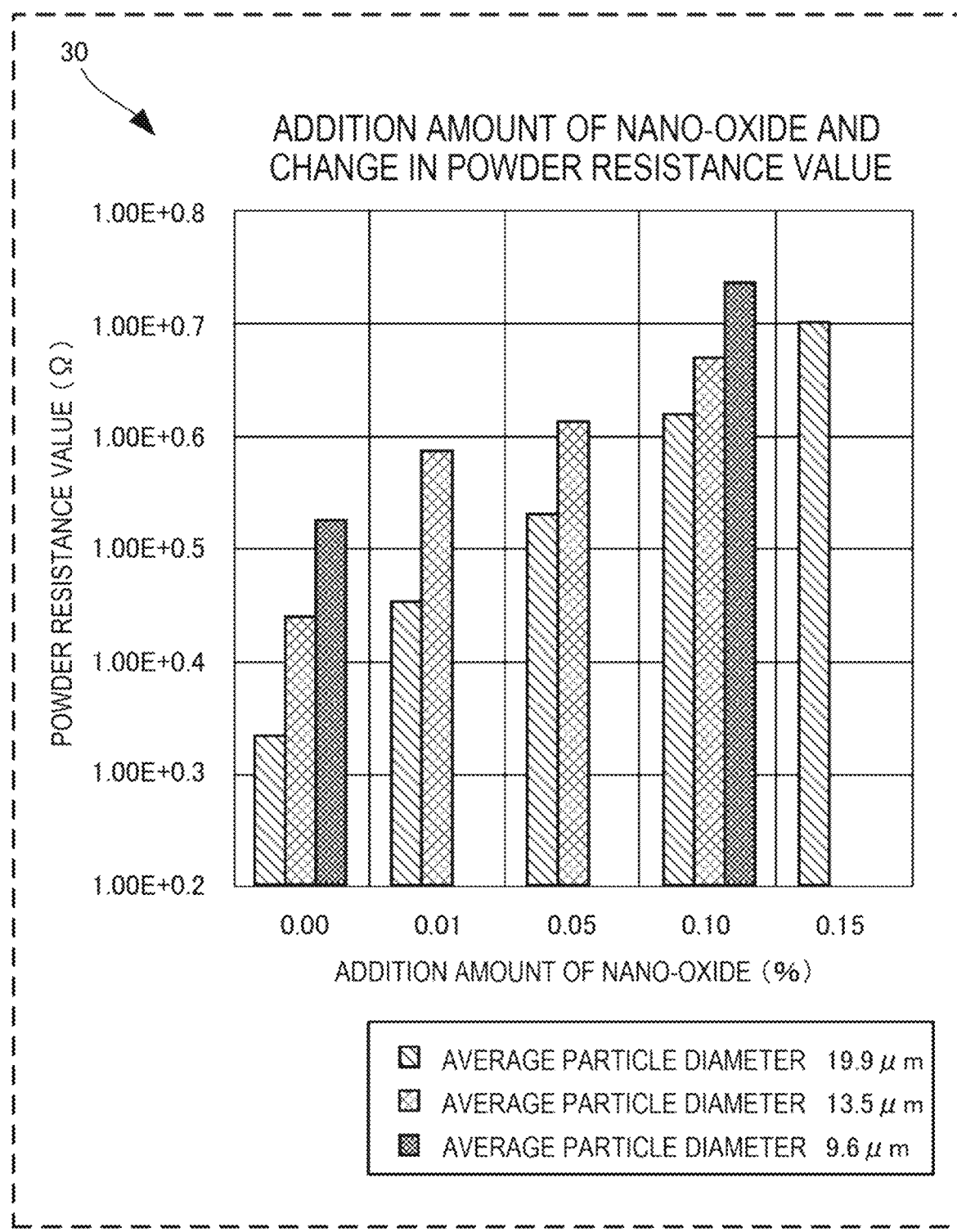
FIG. 3A is a view showing a change in the powder resistance value of the powder mixture of the pure copper powder and the nano-oxide according to the example embodiment of the present invention.
Figure 3B:
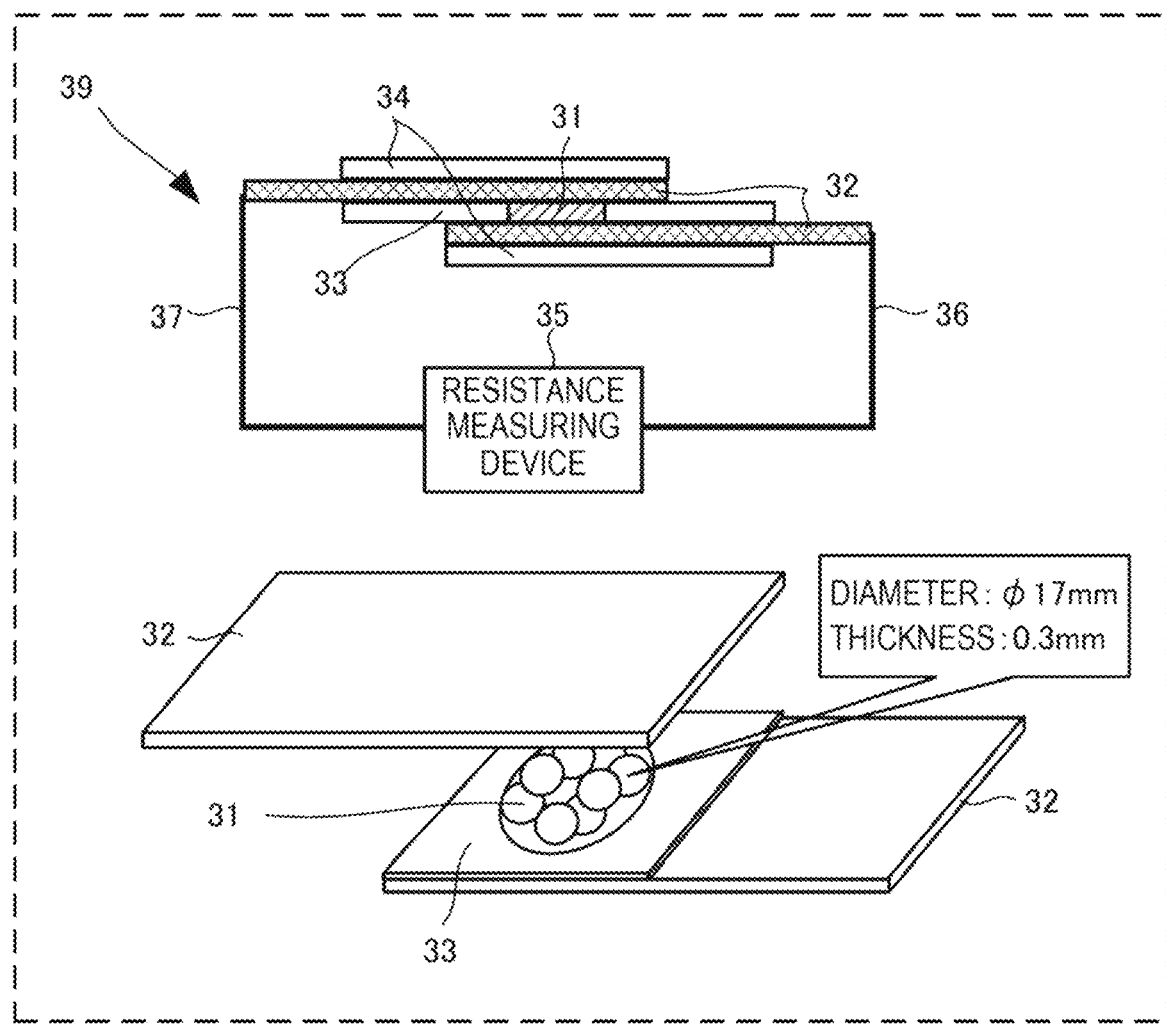
FIG. 3B is a view showing a method of measuring the powder resistance value of the powder mixture of the pure copper powder and the nano-oxide according to the example embodiment of the present invention.

FIG. 3B is a view showing a method of measuring the powder resistance value of the powder mixture of the pure copper powder and the nano-oxide according to this example embodiment. A powder resistance measuring device 39 includes two measurement terminal copper plates 32 connected to two terminals of a resistance measuring device 35 via cables 36 and 37 with contact terminals, an insulator 33 including a hole for storing a measurement target powder 31, and two, upper and lower pressing insulators 34 configured to connect the two measurement terminal copper plates 32 to the measurement target powder 31.

The insulators 33 and 34 are preferably made of rubber with elasticity or the like. In this example embodiment, the hole for storing the measurement target powder 31 has a thickness of 0.3 mm (corresponding to the thickness of the insulator 33) and a diameter of 17 mm. However, the present invention is not limited to this. Any hole that can be closely filled with the measurement target powder 31 and can be sufficiently electrically connected to the two measurement terminal copper plates 32 suffices.

Electrical conductivity=(1/electrical conductivity)=(1/measured powder resistance)×(thickness of hole/sectional area of hole)

Figure 3C:
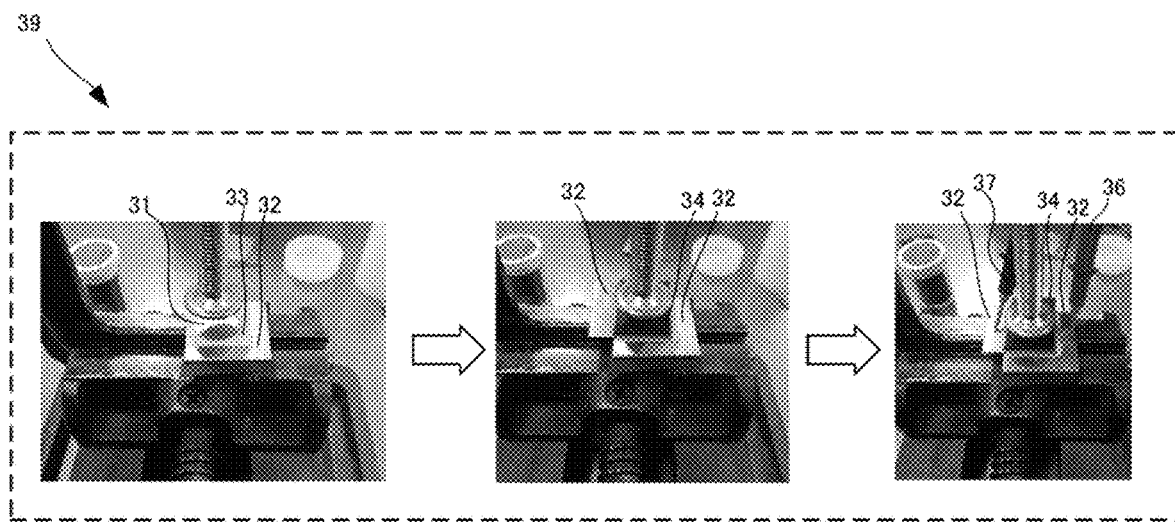
FIG. 3C is a view showing a procedure of measuring the powder resistance value of the powder mixture of the pure copper powder and the nano-oxide according to the example embodiment of the present invention.

FIG. 3C is a view showing a method of measuring the powder resistance value of the powder mixture of the pure copper powder and the nano-oxide according to this example embodiment. Note that the same reference numerals as in FIG. 3B denote the same constituent elements in FIG. 3C, and a repetitive description thereof will be omitted.
(Testing Possibility of Formation of Powder Bed)

Figure 7:
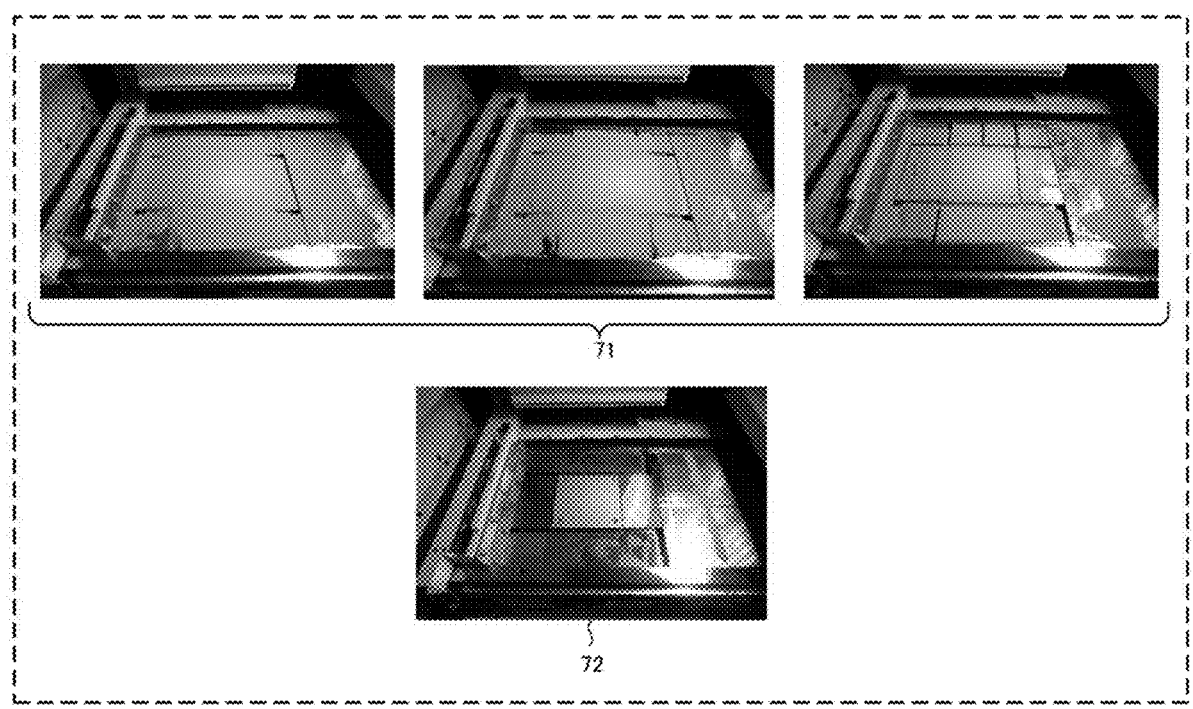
FIG. 7 is a view showing a state in which a powder bed is formed in the laminating and shaping apparatus using the powder according to the example embodiment of the present invention.
Figure 8A:
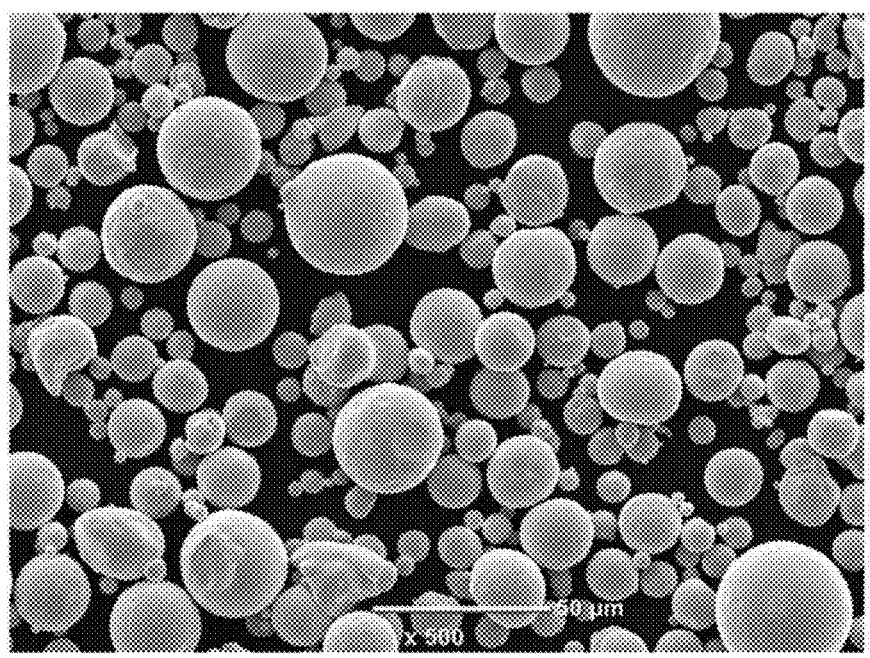
FIG. 8A is a view showing a scanning electron microscope (SEM) image of a pure copper powder with an average particle diameter of 28.6 μm, which is used in the example embodiment of the present invention.
Figure 8B:
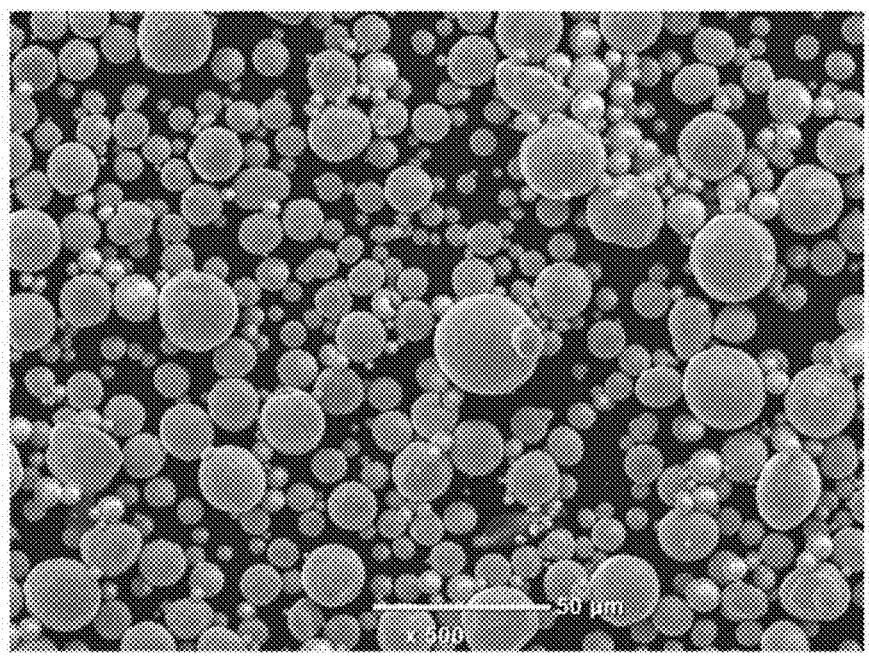
FIG. 8B is a view showing a scanning electron microscope (SEM) image of a pure copper powder with an average particle diameter of 19.9 μm, which is used in the example embodiment of the present invention.
Figure 8C:
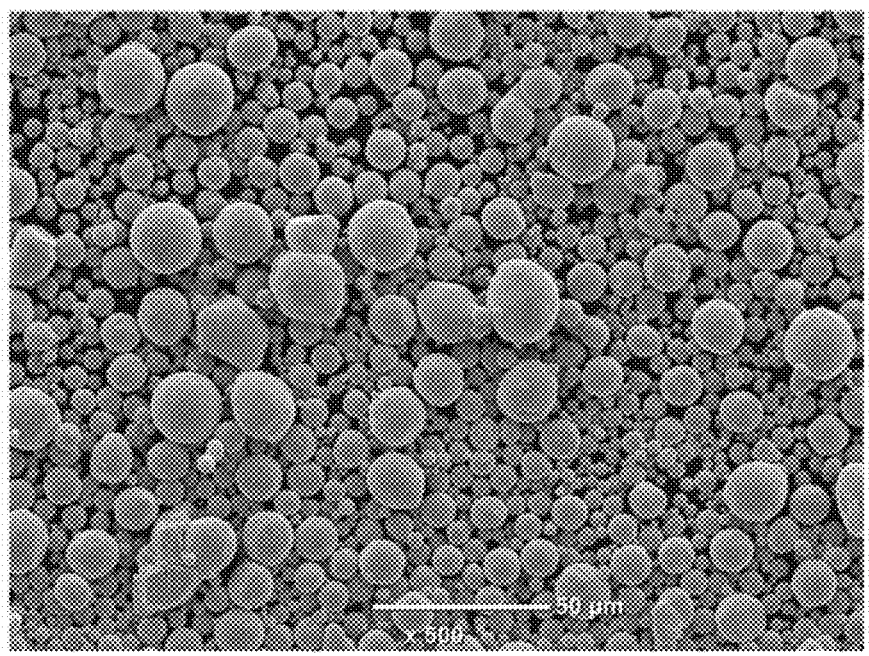
FIG. 8C is a view showing a scanning electron microscope (SEM) image of a pure copper powder with an average particle diameter of 13.5 μm, which is used in the example embodiment of the present invention.
Figure 8D:
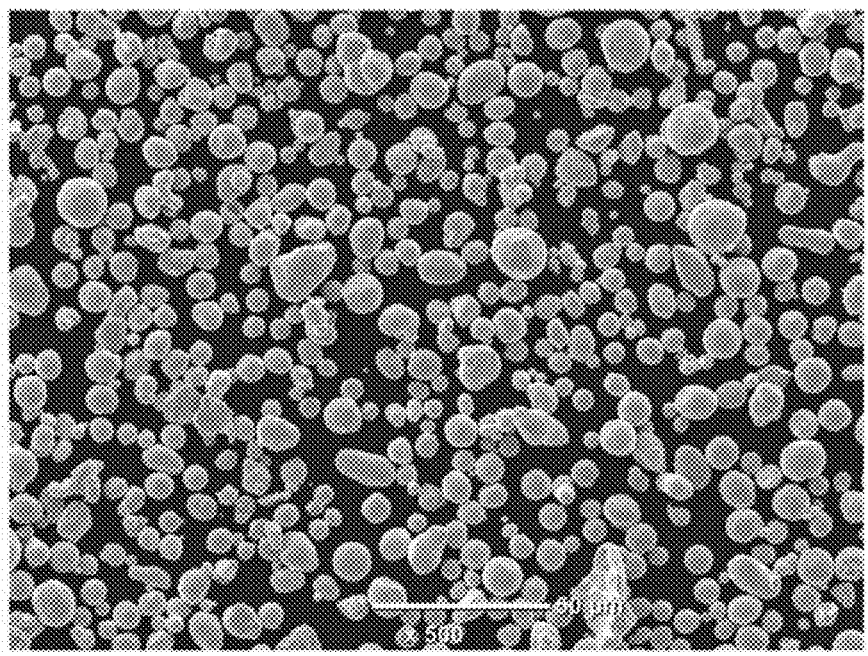
FIG. 8D is a view showing a scanning electron microscope (SEM) image of a pure copper powder with an average particle diameter of 9.6 μm, which is used in the example embodiment of the present invention.
Figure 8E:
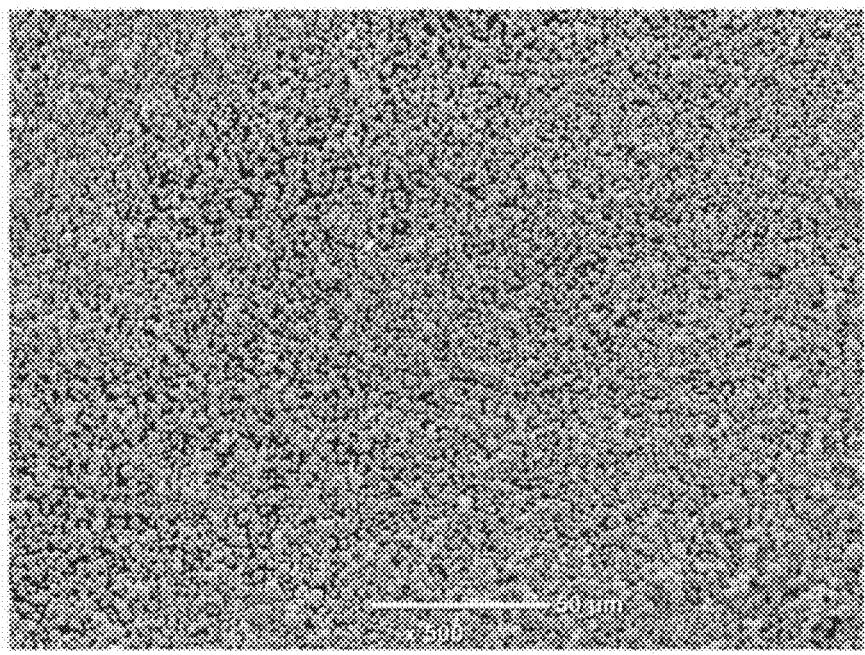
FIG. 8E is a view showing a scanning electron microscope (SEM) image of a pure copper powder with an average particle diameter of 3.1 μm, which is used in the example embodiment of the present invention.

FIG. 7 is a view showing an example of testing the possibility of formation of a powder bed by squeegeeing the laminating and shaping copper powder by the laminating and shaping apparatus 10 in this example embodiment. FIG. 7 shows a powder formation enable state 71 and a formation disable state 72.

<<Measurement of Pure Copper Laminated and Shaped Object According to this Example Embodiment>>

Concerning a pure copper laminated and shaped object manufactured for a laminating and shaping copper powder, the following characteristics were measured.
(Measurement of Electrical Conductivity)

The electrical conductivity (% IACS) of the pure copper laminated and shaped object was measured using an eddy current type conductivity meter.
(Measurement of Density)

The density (%) of the pure copper laminated and shaped object was measured based on a ratio obtained by dividing a gap area by the area of a sectional SEM image.
(Capturing of Surface)

Using a scanning electron microscope (SEM), the surface of the manufactured pure copper laminated and shaped object was captured.

<<Evaluation Result of Laminating and Shaping Copper Powder According to this Example Embodiment>>

An evaluation result showing that the laminating and shaping copper powder according to this example embodiment is useful for shaping of a pure copper laminated and shaped object will be described below.
(Possibility of Powder Bed Formation)

According to squeegeeing of the laminating and shaping copper powder by the laminating and shaping apparatus 10, if the average particle diameter of the laminating and shaping copper powder exceeds 20 μm, a sufficient powder bed can be formed even without addition and mixture of a nano-oxide. However, if the average particle diameter is 20 μm or less, a sufficient powder bed cannot be formed without addition and mixture of a nano-oxide. Also, if the average particle diameter is 5 μm or less, a powder bed cannot be formed even if a nano-oxide is added and mixed.
(Change in Powder Resistance Value Caused by Addition of Nano-Oxide)

FIG. 3A is a view showing a change in a powder resistance value 30 of the powder mixture of the pure copper powder and an addition amount of the nano-oxide according to this example embodiment. The powder resistance value was measured by the powder resistance measuring device 39 shown in FIGS. 3B and 3C.

As shown in FIG. 3A, when the nano-oxide was added and mixed, the powder resistance value 30 increased by a value larger than 10 times in a pure copper powder whose average particle diameter was 20 μm or less.
(Thermal Energy Necessary for Melting Pure Copper Powder)

Figure 4:
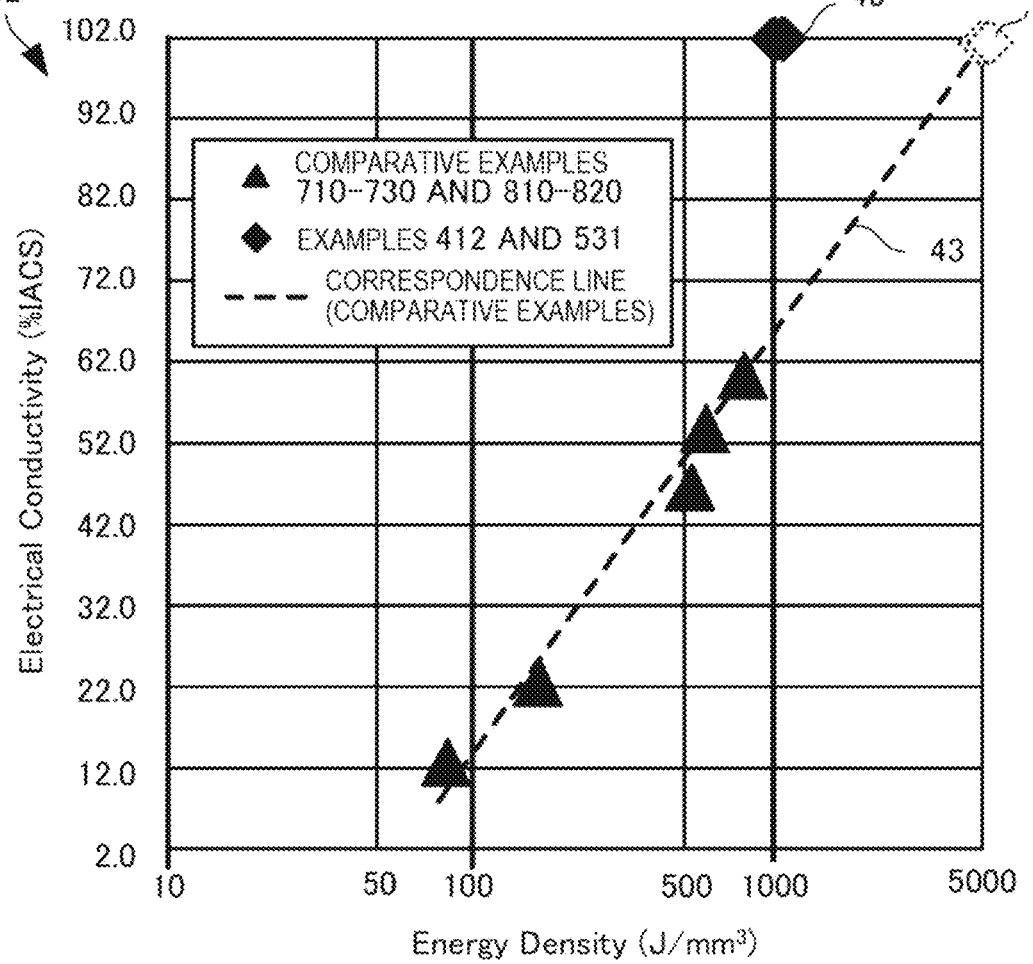
FIG. 4 is a view showing the electrical conductivity of the powder mixture of the pure copper powder and the nano-oxide according to the example embodiment of the present invention and an energy density when manufacturing a laminated and shaped object.

FIG. 4 is a view showing thermal energy necessary for melting the pure copper powder according to this example embodiment. An upper stage 41 of FIG. 4 shows an energy density at which, when using each of copper powders, the density of the shaped object is 99% or more. A lower stage 42 of FIG. 4 shows a graph that compares an energy density necessary for a pure copper powder, which is predicted from a copper alloy powder containing tin (Sn) or a copper alloy powder containing phosphorus (P), with the energy density for the laminating and shaping copper powder according to this example embodiment.

Referring to FIG. 4, black triangles plot the relationship between the electrical conductivity of a copper alloy powder containing tin (Sn) or a copper alloy powder containing phosphorus (P) and a thermal energy necessary for the relative density of a shaped object shaped by melting the powder by laser irradiation to be 99% or more. A line 43 that connect the black triangles shows the correspondence relationship between the electrical conductivity and the thermal energy necessary for melting by laser irradiation. When the electrical conductivity (102.0% IACS) of the pure copper powder used in this example embodiment is made to correspond to the line 43, a thermal energy 44 is predicted to be 5,000 J/mm$^3$ or more, as indicted by white rhombuses.

However, according to the laminating and shaping copper powder of this example embodiment, as indicated by black rhombuses 45, it is possible to provide a laminating and shaping copper powder capable of obtaining a pure copper shaped object having a high density and a high conductivity within the range in which melting can be performed by an existing apparatus with an energy density of about 1,000 J/mm$^3$.
(Energy Density and Electrical Conductivity of Laminated and Shaped Object)

Figure 5:
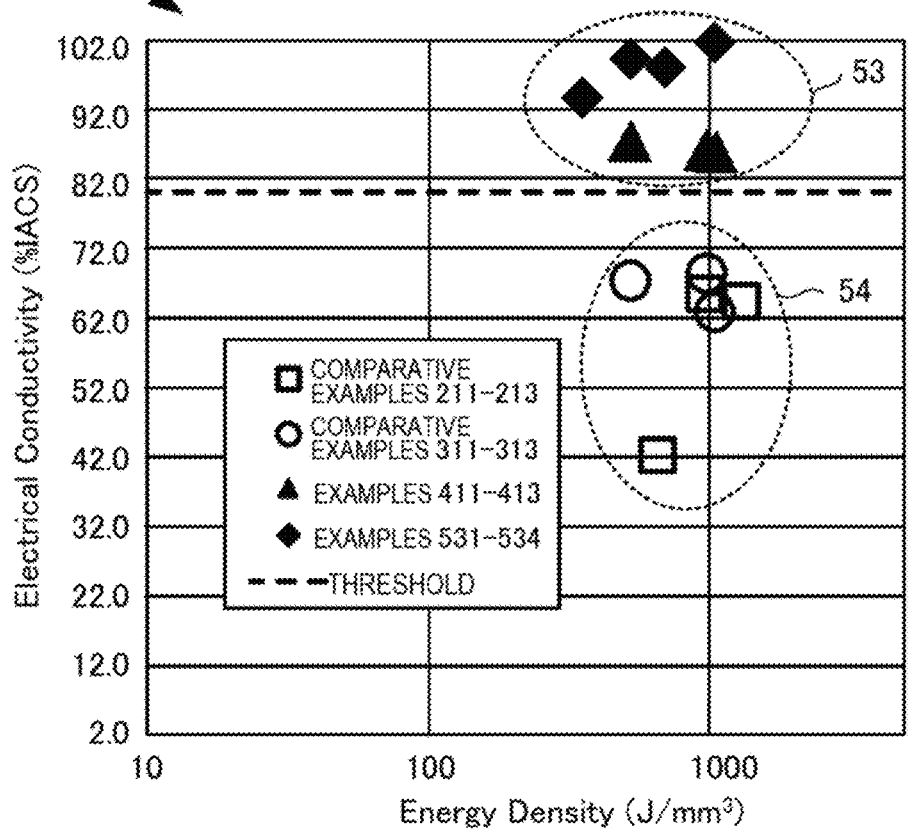
FIG. 5 is a view showing an energy density and the electrical conductivity of a laminated and shaped object of pure copper in a case in which a laminated and shaped object is manufactured from the powder mixture of the pure copper powder and the nano-oxide according to the example embodiment of the present invention.

FIG. 5 is a view showing an energy density and the electrical conductivity of a manufactured laminated and shaped object of pure copper in a case in which a laminated and shaped object is manufactured from the powder mixture of the pure copper powder and the nano-oxide according to this example embodiment.

An upper stage 51 of FIG. 5 shows energy densities and electrical conductivities of shaped objects in comparative examples 211 and 212 in which an average particle diameter was 28.6 μm, and a nano-oxide was not added and mixed, comparative examples 311 to 313 in which an average particle diameter was 19.9 μm, and a nano-oxide was added and mixed, examples 411 to 413 in which an average particle diameter was 13.3 μm, and a nano-oxide was added and mixed, and examples 531 to 534 in which an average particle diameter was 9.6 μm, and a nano-oxide was added and mixed, for which the copper laminated and shaped bodes generated in this example embodiment.

A lower stage 52 of FIG. 5 shows a graph plotted on the abscissa (energy density)/ordinate (electrical conductivity) according to the values in the upper stage 51. As can be seen from the lower stage 52 of FIG. 5, in the comparative examples, the electrical conductivity is only 80% IACS or less in shaping near an energy density of 1,000J/mm$^3$ (see 54). However, in the examples, a pure copper laminated and shaped object having an electrical conductivity of 80% IACS or more can be obtained in shaping near an energy density of 1,000J/mm$^3$ (see 53).

(Composition of Suitable Laminating and Shaping Copper Powder)

In this example embodiment, a nano-oxide is added to a pure copper powder, thereby providing a pure copper powder which satisfies the conditions of the laminating and shaping copper powder and whose laminated and shaped object after laminating and shaping by the laminating and shaping apparatus has the sufficient density and a sufficiently high electrical conductivity as a pure copper product.

In the laminating and shaping copper powder according to this example embodiment, a nano-oxide of 0.01 wt % to 0.20 wt % (100 ppm to 2,000 ppm) is mixed in a copper powder. The average particle diameter of the copper powder falls within the range of 5 μm to 15 μm. Preferably, the average particle diameter of the copper powder falls within the range of 8 μm to 15 μm, and a nano-oxide of 0.01 wt % to 0.10 wt % (100 ppm to 1,000 ppm) is mixed. Here, the nano-oxide contains $SiO_2$, and the primary average particle diameter of the nano-oxide falls within the range of 10 nm to 100 nm.

The powder resistance value of the laminating and shaping copper powder is 10 times to 100 times larger than the powder resistance value of the copper powder, and falls within the range of (7.50E+5) Ω to (2.50E+7) Ω. In addition, the bulk electrical conductivity of the copper powder is 100% JACS or more. Also, the flow rate of the laminating and shaping copper powder measured by JIS Z2502 is 15 sec/50 g to 120 sec/50 g.

<<Effects of this Example Embodiment>>

According to this example embodiment, it was possible to provide a laminating and shaping copper powder to which a nano-oxide was added, and obtain a pure copper laminated and shaped object having a high density and a high electrical conductivity.

That is, a volume amount that enables to melt one particle by a fiber laser can be obtained by setting the particle size within the range of 5 to 15 μm, the flow rate of the powder is improved by mixing a nano-oxide, and a predetermined copper amount per unit volume can be obtained in the powder bed by setting the apparent density as an index of the metal amount in the powder bed to 4.0 to 5.5 g/cm$^3$.

In addition, when the nano-oxide is mixed, an effect of impeding connection between the particles, decreasing contacts between the particles, and increasing the resistance value of the powder can be obtained, and pure copper that is difficult to melt because of its high electrical conductivity can more easily be molten.

This makes it possible to form a laminated and shaped object in which the electrical conductivity of a shaped object shaped under the condition that the energy density calculated from the laser power, the scanning speed, the scanning pitch, and the powder laminating layer thickness becomes 1333 to 533 J/mm$^3$ is 80% IACS or more in an eddy current ET measurement method using sigma check.

EXAMPLES

Examples of a laminating and shaping copper powder that matches the conditions of this example embodiment and a laminating and shaping copper powder that does not match the conditions of this example embodiment will be described below.

<<Manufacturing of Laminating and Shaping Copper Powder>>

(Selection of Pure Copper Powder and Characteristic Measurement)

For example, an atomizing method using a gas such as helium, argon or nitrogen, or high-pressure water is used to product pure copper powders. A pure copper powder to be used in this example is selected by an average particle diameter from pure copper powders generated by adjusting the pressure and the flow amount of the fluid and controlling powdering in the atomizing method.

For pure copper powders containing no nano-oxide, each characteristic measurement shown in <<Measurement of Characteristics of Laminating and Shaping Copper Powder>> was performed. The results are shown in Table 2 below.

TABLE 2

| | Powder Characteristics | | | | | | |
|---|---|---|---|---|---|---|---|
| Pure Copper Powder | Average Particle Diameter (μm) | Nano-Oxide Addition Amount (wt %) | FT4 Measurement Adhesion (kPa) | JIS Z 2504 Apparent Density AD (g/cm$^2$) | JIS Z2502 Flow Rate FR (sec/50 g) | Powder Resistance (Ω) | Powder Bed Formation |
| Pure copper powder 100 | 28.2 | 0.00 | 0.183 | 5.26 | 12.0 | 2.31E+03 | ○ |
| Pure copper powder 200 | 28.6 | 0.00 | 0.716 | 5.13 | none. | 1.24E+06 | ○ |
| Pure copper powder 300 | 19.0 | 0.00 | 0.311 | 4.58 | none. | 2.22E+03 | x |

TABLE 2-continued

| | | | | Powder Characteristics | | | | |
|---|---|---|---|---|---|---|---|---|
| Pure Copper Powder | | Average Particle Diameter (μm) | Nano-Oxide Addition Amount (wt %) | FT4 Measurement Adhesion (kPa) | JIS Z 2504 Apparent Density AD (g/cm$^2$) | JIS Z2502 Flow Rate FR (sec/50 g) | Powder Resistance (Ω) | Powder Bed Formation |
| Pure copper powder 400 | | 13.5 | 0.00 | 0.526 | 4.12 | none. | 2.56E+04 | x |
| Pure copper powder 500 | | 9.6 | 0.00 | 0.349 | 4.23 | none. | 1.83E+05 | x |
| Pure copper powder 600 | | 3.1 | 0.00 | 1.168 | 2.72 | none. | unmeasurable | x |

In addition, the manufactured copper powders of pure copper powders 200 to 600 were captured by a scanning electron microscope (SEM) (SEM×500). FIGS. 8A to 8E show the SEM images of the pure copper powders 200 to 600.

As is apparent from the results shown in Table 2, if no nano-oxide is contained, a powder bed cannot be formed by the laminating and shaping apparatus 10 in the pure copper powders 300 to 600 whose average particle diameters are 20 μm or less. On the other hand, in the pure copper powders 100 and 200 whose average particle diameter is 20 μm or more, a powder bed can be formed by the laminating and shaping apparatus 10. However, as can be seen from Table 3 and Table 4 to be described later, even if a laminated and shaped object is formed by the laminating and shaping apparatus 10, it is impossible to obtain a pure copper shaped object whose electrical conductivity is on the order of 60% IACS and exceeds 80% IACS.

(Addition and Mixing of Nano-Oxide and Characteristic Measurement)

Next, a nano-oxide was added to and mixed with the pure copper powders 300 to 600 which had an average particle diameter of 20 μm or less and for which no powder bed could not be formed by the laminating and shaping apparatus 10.

Figure 9A:
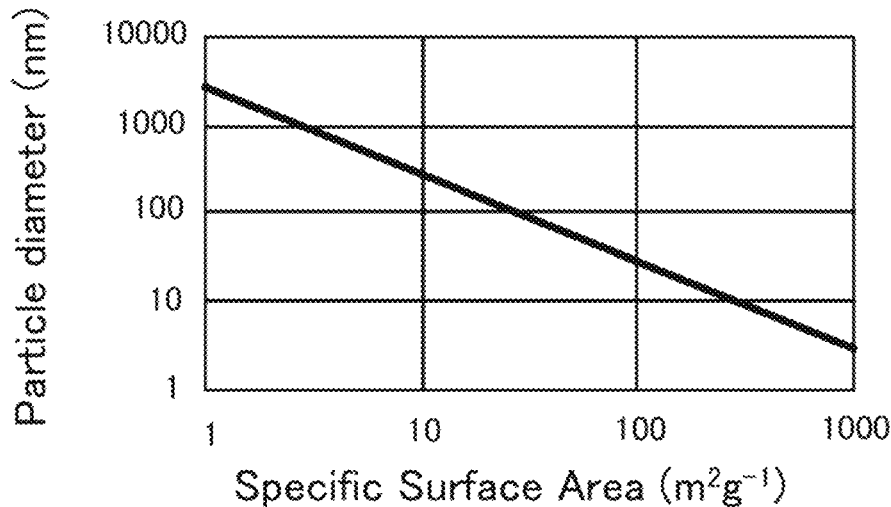
FIG. 9A is a view showing the characteristic of the nano-oxide used in the example embodiment of the present invention.
Figure 9B:
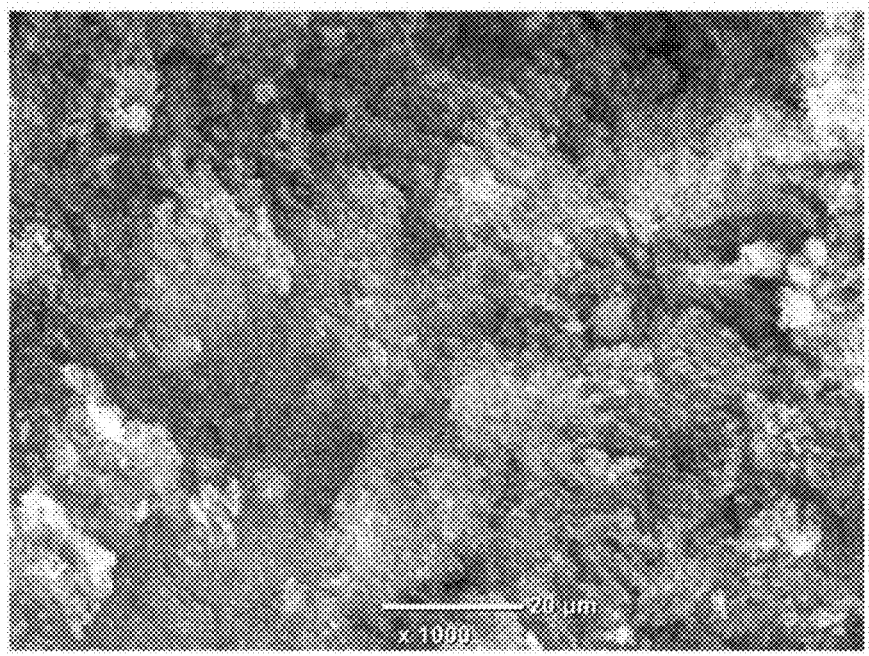
FIG. 9B is a view showing a scanning electron microscope (SEM) image of the nano-oxide used in the example embodiment of the present invention.

As the mixed nano-oxide, AEROSIL® RX 300 (available from NIPPON AEROSIL) was used. FIG. 9A shows the product information of AEROSIL® RX 300. In FIG. 9A, an upper stage 91 shows product information, and a lower stage 92 shows a relation graph for converting "specific surface area" into a particle diameter. In AEROSIL® RX 300, since the specific surface area is 180 to 220 m$^2$/g, the particle diameter is on the order of 10 nm. In addition, FIG. 9B shows a SEM image of AEROSIL® RX 300 (SEM×1000).

Mixing of AEROSIL® RX 300 with the pure copper powders 300 to 600 was done at a rotation speed of 1,500 rpm for 3 min using an OM dizer OMD-3 (available from Nara Machinery).

For laminating and shaping copper powders obtained by adding and mixing a nano-oxide with a pure copper powder in 0.01 wt % to 0.15 wt %, each characteristic measurement shown in <<Measurement of Characteristics of Laminating and Shaping Copper Powder>> was performed. The results are shown in Table 3 below.

TABLE 3

| | | | | Powder Characteristics | | | | |
|---|---|---|---|---|---|---|---|---|
| Pure Copper Powder | Nano-Oxide Added Powder | Average Particle Diameter (μm) | Nano-Oxide Addition Amount (wt %) | FT4 Measurement Adhesion (kPa) | JIS Z 2504 Apparent Density AD (g/cm$^2$) | JIS Z2502 Flow Rate FR (sec/50 g) | Powder Resistance (Ω) | Powder Bed Formation |
| Pure copper powder 300 | powder example 310 | 19.9 | 0.01 | 0.239 | 5.29 | 18.8 | 3.45E+04 | o |
| | powder example 320 | 19.9 | 0.05 | 0.223 | 5.18 | 21.5 | 2.07E+05 | o |
| | powder example 330 | 19.9 | 0.10 | 0.262 | 4.95 | 34.4 | 1.63E+06 | o |
| | powder example 340 | 19.9 | 0.15 | 0.240 | 4.97 | 34.9 | 1.03E+07 | o |
| Pure copper powder 400 | powder example 410 | 13.8 | 0.01 | 0.245 | 5.05 | 37.3 | 7.59E+05 | o |
| | powder example 420 | 13.8 | 0.05 | 0.371 | 5.05 | 38.7 | 1.38E+06 | o |
| | powder example 430 | 13.8 | 0.10 | 0.262 | 4.89 | 73.0 | 5.06E+06 | o |
| | powder example 440 | 13.8 | 0.15 | 0.240 | 4.85 | 62.1 | unmeasurable | o |
| Pure copper powder 500 | powder example 510 | 9.6 | 0.01 | 0.329 | 4.60 | none. | unmeasurable | x |
| | powder example 520 | 9.6 | 0.05 | 0.289 | 4.65 | none. | unmeasurable | x |
| | powder example 530 | 9.6 | 0.10 | 0.331 | 4.43 | 103.0 | 2.13E+07 | o |
| | powder example 540 | 9.6 | 0.15 | 0.342 | 4.28 | 68.0 | unmeasurable | o |

TABLE 3-continued

| | | Powder Characteristics | | | | | | |
|---|---|---|---|---|---|---|---|---|
| Pure Copper Powder | Nano-Oxide Added Powder | Average Particle Diameter (μm) | Nano-Oxide Addition Amount (wt %) | FT4 Measurement Adhesion (kPa) | JIS Z 2504 Apparent Density AD (g/cm$^2$) | JIS Z2502 Flow Rate FR (sec/50 g) | Powder Resistance (Ω) | Powder Bed Formation |
| Pure copper powder 600 | powder example 610 | 3.1 | 0.01 | 0.969 | 2.72 | none. | unmeasurable | x |
| | powder example 620 | 3.1 | 0.05 | 0.649 | 2.72 | none. | unmeasurable | x |
| | powder example 630 | 3.1 | 0.10 | 0.723 | 2.77 | none. | unmeasurable | x |
| | powder example 640 | 3.1 | 0.15 | 0.875 | 2.78 | none. | unmeasurable | x |

In Table 3, first, the powder resistance (see Table 3) of a laminating and shaping copper powder in which a nano-oxide was added and mixed increased by a value larger than 10 times as compared to the powder resistance (see Table 2) of a laminating and shaping copper powder in which no nano-oxide was added and mixed. Additionally, in the pure copper powders 300 and 400 having average particle diameters of 19.9 μm and 13.5 μm, respectively, a powder bed could be formed in all cases in which the nano-oxide was added in 0.01 wt % to 0.15 wt %. Also, in the pure copper powder 500 having an average particle diameter of 9.6 μm, a powder bed could be formed when the nano-oxide was added in 0.10 wt % to 0.15 wt %. However, in the pure copper powder 600 having an average particle diameter of 3.1 μm, no powder bed could be formed when the nano-oxide was added in 0.01 wt % to 0.15 wt %.

(Shaping Processing in Laminating and Shaping Apparatus and Characteristic Measurement)

Laminating and shaping copper powders capable of forming a powder bed in Table 2 and Table 3 were selected, and pure copper laminated and shaped objects were generated by the laminating and shaping apparatus 10. The pure copper laminated and shaped objects were generated while changing the energy density. The energy density is associated with, for example, a laser power, a scanning speed, a scanning pitch, and a powder layer.

For the pure copper laminated and shaped objects generated by the laminating and shaping apparatus 10, each characteristic measurement shown in <<Measurement of Characteristics of Pure Copper Laminated and Shaped Object>> was performed. The results are shown in Table 4 below.

TABLE 4

| | | | Shaping Conditions and Shaped Object Characteristics | | | | | |
|---|---|---|---|---|---|---|---|---|
| Pure Copper Powder | Nano-Oxide Added Powder | Shaping Example | Laser Power (W) | Scanning Speed (mm/sec) | Scanning Pitch (mm) | Powder Layer (mm) | Energy Density (J/mm$^2$) | Shaped Object Electrical Conductivity (% IACS) |
| Pure copper powder 200 | powder example 210 (addition amount 0.00 wt %) | comparative example 211 | 1000 | 300 | 0.05 | 0.05 | 1333.3 | 64.7 |
| | | comparative example 212 | 1000 | 400 | 0.05 | 0.05 | 1000.0 | 66.1 |
| | | comparative example 213 | 1000 | 300 | 0.10 | 0.05 | 666.7 | 42.4 |
| Pure copper powder 300 | powder example 310 (addition amount 0.01 wt %) | comparative example 311 | 800 | 300 | 0.05 | 0.05 | 1066.7 | 63.2 |
| | | comparative example 312 | 1000 | 400 | 0.05 | 0.05 | 1000.0 | 68.5 |
| | | comparative example 313 | 800 | 300 | 0.05 | 0.10 | 533.3 | 67.5 |
| Pure copper powder 400 | powder example 410 (addition amount 0.01 wt %) | comparative example 411 | 800 | 300 | 0.05 | 0.05 | 1006.7 | 86.1 |
| | | comparative example 412 | 1000 | 400 | 0.05 | 0.05 | 1000.0 | 86.7 |
| | | comparative example 413 | 800 | 300 | 0.05 | 0.10 | 533.3 | 87.4 |
| Pure copper powder 500 | powder example 530 (addition amount 0.10 wt %) | comparative example 531 | 800 | 200 | 0.08 | 0.05 | 1066.7 | 101.9 |
| | | comparative example 532 | 800 | 300 | 0.08 | 0.05 | 711.1 | 98.4 |
| | | comparative example 533 | 800 | 200 | 0.15 | 0.05 | 533.3 | 99.7 |
| | | comparative example 534 | 800 | 300 | 0.15 | 0.05 | 355.6 | 94.1 |

In Table 4, in each of the pure copper laminated and shaped objects indicated by examples 411 to 413 and 531 to 534, the electrical conductivity of the shaped object achieves 80% IACS or more, which is the target of the example embodiment. Also, as shown in the table 41 of FIG. 4, the relative density of the shaped object also exceeds 99%.

Figure 10A:
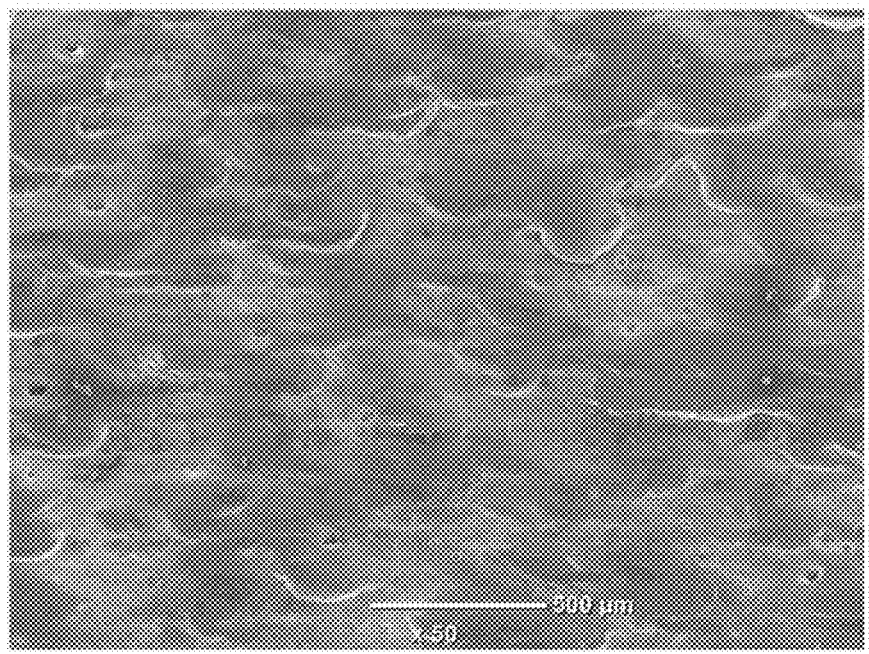
FIG. 10A is a view showing a scanning electron microscope (SEM) image of a laminated and shaped object surface of pure copper manufactured from the powder mixture of a pure copper powder having an average particle diameter of 9.6 μm and a nano-oxide of 0.10 wt % in the example embodiment of the present invention.
Figure 10B:
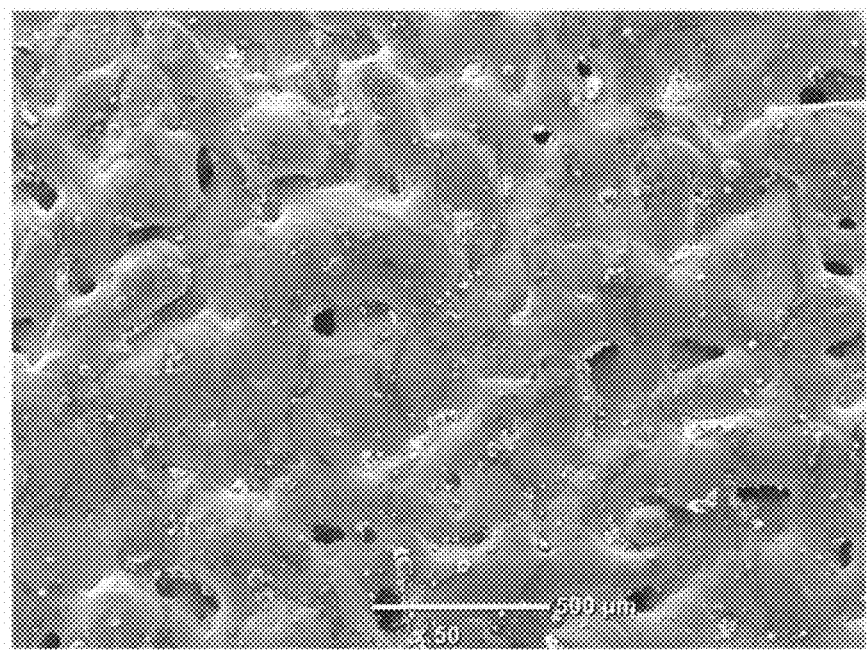
FIG. 10B is a view showing a scanning electron microscope (SEM) image of a laminated and shaped object surface of pure copper manufactured from the powder mixture of a pure copper powder having an average particle diameter of 13.5 μm and a nano-oxide of 0.01 wt % in the example embodiment of the present invention.
Figure 10C:
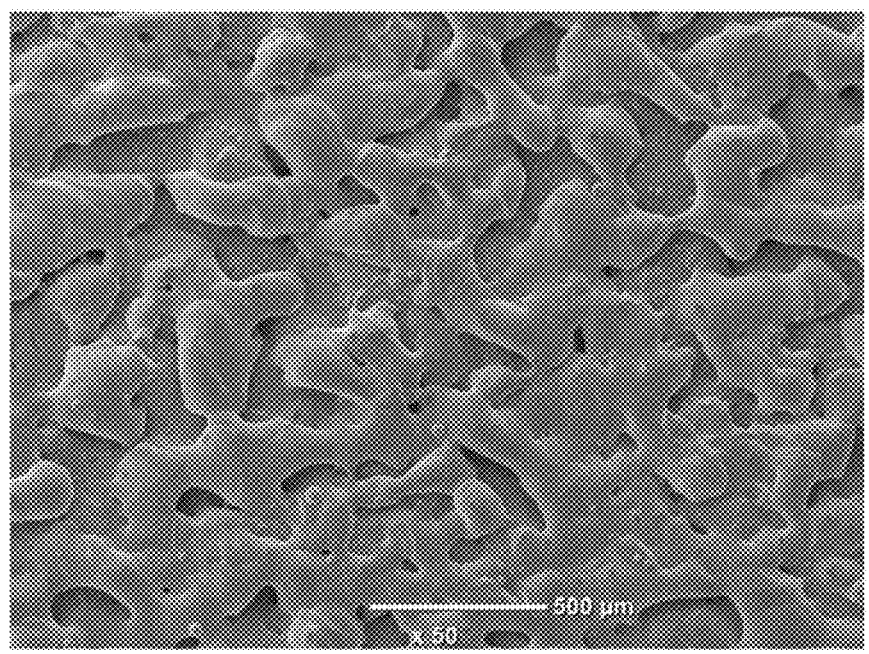
FIG. 10C is a view showing a scanning electron microscope (SEM) image of a laminated and shaped object surface of pure copper manufactured from the powder mixture of a pure copper powder having an average particle diameter of 19.9 μm and a nano-oxide of 0.10 wt % in a comparative example of the present invention.
Figure 10D:
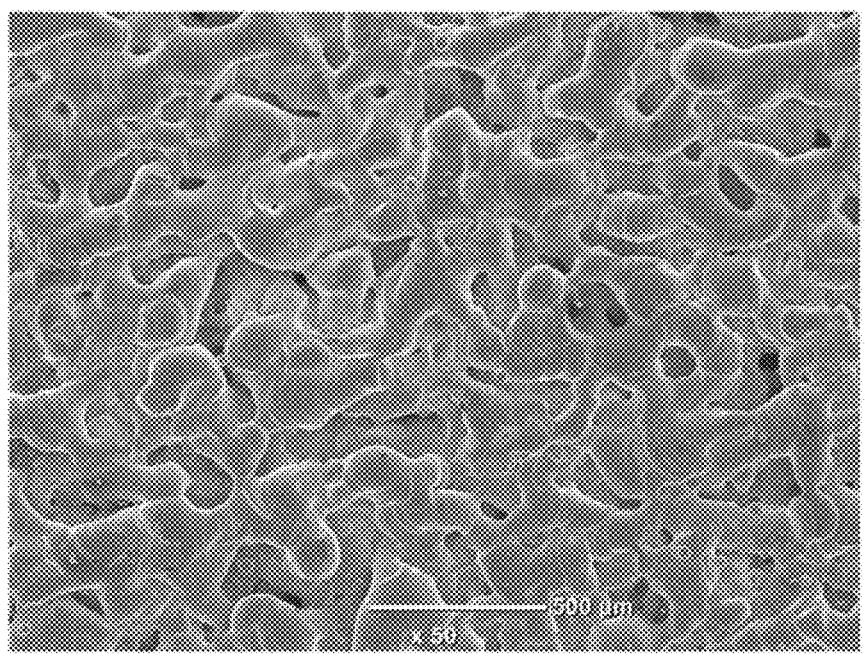
FIG. 10D is a view showing a scanning electron microscope (SEM) image of a laminated and shaped object surface of pure copper manufactured from a pure copper powder having an average particle diameter of 28.6 μm in the example embodiment of the present invention.

FIGS. 10A to 10D show (SEM) images (×50) obtained by capturing the surfaces of the laminated and shaped objects according to the examples and the comparative examples. FIG. 10A shows a SEM image (×50) obtained by capturing the surface of the pure copper laminated and shaped object of example 531 (an example in which a nano-oxide of 0.10 wt % was added and mixed in pure copper particles having an average particle diameter of 9.6 μm). FIG. 10B shows a SEM image (×50) obtained by capturing the surface of the pure copper laminated and shaped object of example 412 (an example in which a nano-oxide of 0.01 wt % was added and mixed in pure copper particles having an average particle diameter of 13.5 μm). FIG. 10C shows a SEM image (×50) obtained by capturing the surface of the pure copper laminated and shaped object of comparative example 312 (an example in which a nano-oxide of 0.01 wt % was added and mixed in pure copper particles having an average particle diameter of 19.9 μm). FIG. 10D shows a SEM image (×50) obtained by capturing the surface of the pure copper laminated and shaped object of comparative example 212 (pure copper particles having an average particle diameter of 28.6 μm).

In FIGS. 10A and 10B, since the surface of the laminated and shaped object is dense and has little unevenness, the relative density and the electrical conductivity are high. In FIGS. 10C and 10D, since the surface of the laminated and shaped object has gaps and unevenness, it is considered that the relative density and the electrical conductivity are not high.

That is, when the particle diameter becomes small depending on the surface state, melting by laser is stable, and a smooth shaped surface can be obtained. If the particle diameter becomes large, melting by laser is unstable, and an uneven shaped surface is obtained because of balling for spherodizing molten copper. Because of this unevenness, holes are formed in the shaped object, and the shaping density lowers, as can be seen.

That is, each of the pure copper laminated and shaped objects generated using the laminating and shaping powders of the examples achieves "a relative density of 99% or more" and "an electrical conductivity of 80% IACS or more" which are (conditions as a pure copper laminated and shaped object) and satisfies conditions as the pure copper laminated and shaped object.

Note that Table 5 and Table 6 below show the whole examples.

TABLE 5

| Pure Copper Powder | Nano-Oxide Added Powder | Shaping Example | Powder Characteristics | | | | | | |
|---|---|---|---|---|---|---|---|---|---|
| | | | Average Particle Diameter (μm) | Nano-Oxide Addition Amount (wt %) | FT4 Measurement Adhesion (kPa) | JIS Z2504 Apparent Density AD (g/cm³) | JIS Z2502 Flow Rate FR (sec/50 g) | Powder Resistance (Ω) | Powder Bed Formation |
| Pure copper powder 100 | no addition | | 28.2 | 0.00 | 0.183 | 5.26 | 12.0 | 2.31E+03 | ○ |
| Pure copper powder 200 | without addition (powder example 210) | comparative example 211 comparative example 212 comparative example 213 | 28.6 | 0.00 | 0.716 | 5.13 | none. | 1.24E+06 | ○ |
| Pure copper powder 300 | without addition | | 19.9 | 0.00 | 0.311 | 4.58 | none. | 2.22E+03 | x |
| | powder example 310 | comparative example 311 comparative example 312 comparative example 313 | 19.9 | 0.01 | 0.239 | 5.29 | 18.8 | 3.45E+04 | ○ |
| | powder example 320 | comparative example 321 | 19.9 | 0.05 | 0.223 | 5.18 | 21.5 | 2.07E+05 | ○ |
| | powder example 330 | comparative example 331 | 19.9 | 0.10 | 0.262 | 4.95 | 34.4 | 1.63E+06 | ○ |
| | powder example 340 | comparative example 341 | 19.9 | 0.15 | 0.240 | 4.97 | 34.9 | 1.03E+07 | ○ |
| Pure copper powder 400 | without addition | | 13.5 | 0.00 | 0.326 | 4.12 | none. | 2.56E+04 | x |
| | powder example 410 | example 411 example 412 example 413 | 13.5 | 0.01 | 0.245 | 5.05 | 57.3 | 7.59E+05 | ○ |
| | powder example 420 | example 421 | 13.5 | 0.05 | 0.371 | 5.05 | 58.7 | 1.38E+06 | ○ |
| | powder example 430 | example 431 | 13.5 | 0.10 | 0.262 | 4.89 | 73.0 | 5.06E+07 | ○ |

TABLE 5-continued

| | | Shaping Conditions and Shaped Object Characteristics | | | | | | |
|---|---|---|---|---|---|---|---|---|
| Pure Copper Powder | Nano-Oxide Added Powder | Shaping Example | Laser Power (W) | Scanning Speed (mm/sec) | Scanning Pitch (mm) | Powder Layer (mm) | Energy Density (J/mm$^3$) | Shaped Object Electrical Conductivity (% IACS) |
| powder example 440 | | example 441 | 13.5 | 0.15 | 0.240 | 4.85 | 62.1 | un-measurable ○ |
| Pure copper powder 100 | no addition | | | | | | | |
| Pure copper powder 200 | without addition (powder example 210) | comparative example 211 | 1000 | 300 | 0.05 | 0.05 | 1333.3 | 64.7 |
| | | comparative example 212 | 1000 | 400 | 0.05 | 0.05 | 1000.0 | 66.1 |
| | | comparative example 213 | 1000 | 300 | 0.10 | 0.05 | 666.7 | 42.4 |
| Pure copper powder 300 | without addition | | | unshapable | | | | |
| | powder example 310 | comparative example 311 | 800 | 300 | 0.05 | 0.05 | 1066.7 | 63.2 |
| | | comparative example 312 | 1000 | 400 | 0.05 | 0.05 | 1000.0 | 68.5 |
| | | comparative example 313 | 800 | 300 | 0.05 | 0.10 | 533.3 | 67.5 |
| | powder example 320 | comparative example 321 | 1000 | 400 | 0.05 | 0.05 | 1000.0 | 67.4 |
| | powder example 330 | comparative example 331 | 1000 | 400 | 0.05 | 0.05 | 1000.0 | 67.8 |
| | powder example 340 | comparative example 341 | 1000 | 400 | 0.05 | 0.05 | 1000.0 | 68.8 |
| Pure copper powder 400 | without addition | | | unshapable | | | | |
| | powder example 410 | example 411 | 800 | 300 | 0.05 | 0.05 | 1066.7 | 86.1 |
| | | example 412 | 1000 | 400 | 0.05 | 0.05 | 1000.0 | 86.7 |
| | | example 413 | 800 | 300 | 0.05 | 0.10 | 533.3 | 87.4 |
| | powder example 420 | example 421 | 1000 | 400 | 0.05 | 0.05 | 1000.0 | 86.7 |
| | powder example 430 | example 431 | 1000 | 400 | 0.05 | 0.05 | 1000.0 | 87.1 |
| | powder example 440 | example 441 | 1000 | 400 | 0.05 | 0.05 | 1000.0 | 87.6 |

TABLE 6

| | | | Powder Characteristics | | | | | | |
|---|---|---|---|---|---|---|---|---|---|
| Pure Copper Powder | Nano-Oxide Added Powder | Shaping Example | Average Particle Diameter (μm) | Nano-Oxide Addition Amount (wt %) | FT4 Measurement Adhesion (kPa) | JIS Z2504 Apparent Density AD (g/cm$^3$) | JIS Z2502 Flow Rate FR (sec/50 g) | Powder Resistance (Ω) | Powder Bed Formation |
| Pure copper powder 500 | without addition | | 9.6 | 0.00 | 0.349 | 4.23 | none. | 1.83E+03 | x |
| | powder example 510 | | 9.6 | 0.10 | 0.229 | 4.32 | none. | 4.86E+06 | x |
| | powder example 520 | | 9.6 | 0.05 | 0.289 | 4.35 | none. | 9.81E+06 | x |
| | powder example 530 | example 531 example 532 example 534 example 534 | 9.6 | 0.01 | 0.231 | 4.43 | 101.0 | 2.33E+07 | ○ |
| | powder example 540 | example 541 | 9.6 | 0.15 | 0.242 | 4.28 | 68.0 | unmeasurable | ○ |
| Pure copper powder 600 | without addition | | 3.1 | 0.00 | 1.168 | 2.72 | none. | unmeasurable | x |
| | powder example 610 | | 3.1 | 0.01 | 0.969 | 2.72 | none. | unmeasurable | x |
| | powder example 620 | | 3.1 | 0.05 | 0.649 | 2.72 | none. | unmeasurable | x |
| | powder example 630 | | 3.1 | 0.10 | 0.722 | 2.77 | none. | unmeasurable | x |
| | powder example 640 | | 3.1 | 0.15 | 0.875 | 2.78 | none. | unmeasurable | x |

TABLE 6-continued

| Pure Copper Powder | Nano-Oxide Added Powder | Shaping Example | shaping conditions and shaped object characteristics | | | | | |
|---|---|---|---|---|---|---|---|---|
| | | | Laser Power (W) | Scanning Speed (mm/sec) | Scanning Pitch (mm) | Powder Layer (mm) | Energy Density (J/mm$^3$) | Shaped Object Electrical Conductivity (% IACS) |
| Pure copper powder 500 | without addition | | | | | | unshapable | |
| | powder example 510 | | | | | | unshapable | |
| | powder example 520 | | | | | | unshapable | |
| | powder example 530 | example 531 | 800 | 200 | 0.08 | 0.05 | 1066.7 | 101.9 |
| | | example 532 | 800 | 300 | 0.08 | 0.05 | 711.1 | 98.4 |
| | | example 534 | 800 | 200 | 0.15 | 0.05 | 533.3 | 99.7 |
| | | example 534 | 800 | 300 | 0.15 | 0.05 | 355.6 | 94.1 |
| | powder example 540 | example 541 | 800 | 300 | 0.08 | 0.05 | 711.1 | 99.2 |
| Pure copper powder 600 | without addition | | | | | | unshapable | |
| | powder example 610 | | | | | | unshapable | |
| | powder example 620 | | | | | | unshapable | |
| | powder example 630 | | | | | | unshapable | |
| | powder example 640 | | | | | | unshapable | |

(Comparison with Copper Alloy Powder Containing Tin (Sn) or Copper Alloy Powder Containing Phosphorus (P))

As comparative examples 710 to 730, 810, and 820, copper laminated and shaped objects were generated by the laminating and shaping apparatus 10 using a copper alloy powder containing tin (Sn) or a copper alloy powder containing phosphorus (P). The characteristics (a bulk electrical conductivity, an average particle diameter, and the like) of the copper alloy powders and the characteristics (an energy density during laminating and shaping, the relative density of the laminated and shaped object) of laminating and shaping were measured. The measurement results are shown in the table 41 of FIG. 4 described above.

These were compared with the characteristics of the pure copper laminated and shaped object generated by the laminating and shaping apparatus 10 using a powder in which the nano-oxide according to this example was added and mixed. As described above with reference to FIG. 4, according to the powder in which the nano-oxide according to this example was added and mixed, a laminated and shaped object having a relative density of 99% or more could be generated by an existing apparatus with an energy density of about 1,000 J/mm$^3$, and as can be assumed from the bulk electrical conductivity, a pure copper laminated and shaped object having an electrical conductivity of 80% IACS or more could be provided.

<<Copper Powder Material in which Nano-Oxide Other than SiO$_2$ is Added and Mixed>>

Table 7 below shows the result of performing each characteristic measurement shown in <<Measurement of Characteristics of Laminating and Shaping Copper Powder>> for the copper powder materials shown in Table 1, in which nano-oxides other than SiO$_2$ were added and mixed.

TABLE 7

| Powder Characteristics | | | | | | |
|---|---|---|---|---|---|---|
| Average Particle Disorder (μm) | Nano-Oxide | | FT4 Measurement Adhesion (kPa) | JIS Z 2504 Apparent Density AD (g/cm$^3$) | JIS Z2502 Flow Rate FR (sec/50 g) | Powder Resistance (Ω) |
| | Oxide Name | Addition Amount (wt %) | | | | |
| 19.9 | copper oxide | 0.01 | | 4.35 | none. | 3.57E+03 |
| 19.9 | copper oxide | 0.05 | | 4.89 | none. | 4.40E+03 |
| 19.9 | copper oxide | 0.10 | | 5.09 | 34.2 | 6.42E+03 |
| 19.9 | copper oxide | 0.15 | | 5.11 | 30.5 | 7.60E+03 |
| 19.9 | aluminum oxide | 0.01 | | 4.42 | none. | 1.09E+04 |
| 19.9 | aluminum oxide | 0.05 | | 4.73 | none. | 1.21E+04 |
| 19.9 | aluminum oxide | 0.10 | | 4.06 | 48.3 | 2.02E+04 |
| 19.9 | aluminum oxide | 0.15 | | 5.02 | 46.3 | 3.35E+04 |
| 19.9 | yttrium oxide | 0.01 | | 4.46 | none. | 3.55E+04 |
| 19.9 | yttrium oxide | 0.05 | | 4.87 | none. | 6.22E+03 |
| 19.9 | yttrium oxide | 0.10 | | 4.98 | 38.6 | 1.42E+04 |
| 19.9 | yttrium oxide | 0.15 | | 4.89 | 31.6 | 2.21E+05 |
| 19.9 | titanium oxide | 0.01 | | 4.33 | none. | 1.02E+04 |
| 19.9 | titanium oxide | 0.05 | | 4.48 | none. | 1.24E+04 |
| 19.9 | titanium oxide | 0.10 | | 4.46 | none. | 1.38E+04 |
| 19.9 | titanium oxide | 0.15 | | 4.79 | 51.6 | 2.75E+04 |
| 13.5 | copper oxide | 0.01 | | 4.13 | none. | 4.05E+04 |
| 13.5 | copper oxide | 0.05 | | 4.21 | none. | 1.02E+05 |
| 13.5 | copper oxide | 0.10 | | 4.63 | none. | 2.50E+05 |
| 13.5 | copper oxide | 0.15 | | 4.79 | 79.6 | 3.76E+05 |
| 13.5 | aluminum oxide | 0.01 | | 4.01 | none. | 3.89E+04 |
| 13.5 | aluminum oxide | 0.05 | | 4.11 | none. | 8.45E+04 |
| 13.5 | aluminum oxide | 0.10 | | 4.31 | none. | 3.29E+05 |
| 13.5 | aluminum oxide | 0.15 | | 4.77 | 69.4 | 4.08E+05 |
| 13.5 | yttrium oxide | 0.01 | | 4.06 | none. | 6.02E+04 |

TABLE 7-continued

Powder Characteristics

| Average Particle Disorder (μm) | Nano-Oxide Oxide Name | Nano-Oxide Addition Amount (wt %) | FT4 Measurement Adhesion (kPa) | JIS Z 2504 Apparent Density AD (g/cm$^3$) | JIS Z2502 Flow Rate FR (sec/50 g) | Powder Resistance (Ω) |
|---|---|---|---|---|---|---|
| 13.5 | yttrium oxide | 0.05 | | 4.16 | none. | 2.22E+05 |
| 13.5 | yttrium oxide | 0.10 | | 4.43 | none. | 2.67E+05 |
| 13.5 | yttrium oxide | 0.15 | | 4.64 | 84.3 | 2.90E+05 |
| 13.5 | titanium oxide | 0.01 | | 4.04 | none. | 4.04E+04 |
| 13.5 | titanium oxide | 0.05 | | 1.11 | none. | 7.19E+04 |
| 13.5 | titanium oxide | 0.10 | | 4.40 | none. | 2.53E+05 |
| 13.5 | titanium oxide | 0.15 | | 4.66 | 95.3 | unmeasurable |
| 9.6 | copper oxide | 0.01 | | 4.03 | none. | 2.02E+06 |
| 9.6 | copper oxide | 0.05 | | 4.11 | none. | 2.26E+06 |
| 9.6 | copper oxide | 0.10 | | 4.28 | none. | 2.60E+06 |
| 9.6 | copper oxide | 0.15 | | 4.39 | none. | 3.29E+06 |
| 9.6 | aluminum oxide | 0.01 | | 4.06 | none. | 3.32E+06 |
| 9.6 | aluminum oxide | 0.05 | | 4.16 | none. | 1.24E+07 |
| 9.6 | aluminum oxide | 0.10 | | 4.28 | none. | 1.46E+07 |
| 9.6 | aluminum oxide | 0.15 | | 4.39 | none. | unmeasurable |
| 9.6 | yttrium oxide | 0.01 | | 4.08 | none. | 1.61E+06 |
| 9.6 | yttrium oxide | 0.05 | | 4.14 | none. | 4.30E+05 |
| 9.6 | yttrium oxide | 0.10 | | 4.24 | none. | 7.71E+05 |
| 9.6 | yttrium oxide | 0.15 | | 4.40 | none. | 1.12E+06 |
| 9.6 | titanium oxide | 0.01 | | 4.08 | none. | 2.69E+05 |
| 9.6 | titanium oxide | 0.05 | | 4.12 | none. | 1.63E+07 |
| 9.6 | titanium oxide | 0.10 | | 4.20 | none. | 2.44E+07 |
| 9.6 | titanium oxide | 0.15 | | 4.34 | none. | unmeasurable |

As is apparent from the test results of the copper powder materials in which $SiO_2$ is added and mixed, which are shown in Table 5 and Table 6, for example, if the flow rate does not impede formation of the powder bed, and the powder resistance is (1.00E+4) Ω or more, a copper laminated and shaped object having an electrical conductivity of 60% IACS or more can be generated. It can also be seen that if the powder resistance falls within the range of (7.50E+5) Ω to (2.50E+7) Ω, an electrical conductivity of 80% IACS or more can be achieved. When compared to the test results of the copper powder materials in which $SiO_2$ is added and mixed, the following points can be known from the results of the powder characteristics shown in Table 7.

In the pure copper powder having an average particle diameter of 19.9 μm, a powder material in which a copper oxide or yttrium oxide is added and mixed sometime has a powder resistance less than (1.00E+4) Ω, and achievement of a sufficient electrical conductivity cannot be expected. However, a powder material in which an aluminum oxide or titanium oxide is added and mixed has a powder resistance of (1.00E+4) Ω or more, and can generate a copper laminated and shaped object having an electrical conductivity or 60% IACS or more, as is apparent.

Also, a pure copper powder having an average particle diameter of 13.5 μm has a powder resistance of (1.00E+4) Ω or more, and can generate a copper laminated and shaped object having an electrical conductivity of 60% IACS or more, as is apparent, independently of the nano-oxide added and mixed in the powder material.

Furthermore, in a pure copper powder having an average particle diameter of 9.6 μm, many powder materials in which a nano-oxide is added and mixed are expected to have a powder resistance within the range of (7.50E+5) Ω to (2.50E+7) Ω and be able to achieve an electrical conductivity or 80% IACS or more.

As described above, even concerning a powder material obtained by adding and mixing a nano-oxide other than $SiO_2$ in a pure copper powder having an average particle diameter of 13.5 μm or 9.6 μm, a copper laminated and shaped object can be expected to be able to achieve 80% IACS or more that is an electrical conductivity of a pure copper product, as in a case of $SiO_2$.

[Effects of Example]

According to this example, in a case of a laminating and shaping powder obtained by adding and mixing a nano-oxide in a pure copper powder having an average particle diameter of 13.5 μm or 9.6 μm, the powder resistance value of the laminating and shaping copper powder capable of forming a powder bed and containing a pure copper powder falls within the range of (7.50E+5) Ω to (2.50E+7) Ω. Also, it is possible to generate a copper laminated and shaped object having a relative density of 99% or more by melting at the energy density of an existing apparatus, and the electrical conductivity of the copper laminated and shaped object can achieve 80% IACS or more, which is the electrical conductivity of a pure copper product.

On the other hand, in a case of a pure copper powder having an average particle diameter of 28.6 μm or a laminating and shaping powder of a copper alloy of tin (Sn) or a copper alloy of phosphorus (P), it is possible to generate a copper laminated and shaped object having a relative density of 99% or more by melting at the energy density of an existing apparatus, but the electrical conductivity of the copper laminated and shaped object cannot be 80% IACS or more, which is the electrical conductivity of a pure copper product.

Also, in a case of a laminating and shaping powder obtained by adding and mixing a nano-oxide in a pure copper powder having an average particle diameter of 19.9 μm, it is possible to generate a copper laminated and shaped object having a relative density of 99% or more by melting at the energy density of an existing apparatus, but the electrical conductivity of the copper laminated and shaped object cannot be 80% IACS or more, which is the electrical conductivity of a pure copper product.

Furthermore, in a case of a laminating and shaping powder obtained by adding and mixing a nano-oxide in a pure copper powder having an average particle diameter of 3.1 μm, a powder bed cannot be formed at all.

[Other Example Embodiments]

In the example embodiment and examples, nano-silica ($SiO_2$) was used as the nano-oxide to be added and mixed. However, a nano-oxide that can be molten at the energy density of an existing apparatus by reducing the powder resistance from a pure copper powder having an average particle diameter of 20 μm and can also improve the flow rate and form a powder bed by the existing apparatus suffices. Also, a nano-oxide that allows a pure copper laminated and shaped object generated by the laminating and shaping apparatus to have a density of 99% or more and allows the electrical conductivity to be 80% IACS or more suffices. The shape or particle diameter of the nano-oxide is also suitably selected.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims. A system or apparatus including any combination of the individual features included in the respective example embodiments may be incorporated in the scope of the present invention.

The invention claimed is:

1. A laminating and shaping copper powder, in which a pure copper powder and a nano-oxide of equal to or more than 0.10 wt % and equal to or less than 0.20 wt % are mixed,
   wherein the pure copper powder comprises spherical particles having an average particle diameter equal to or more than 5 μm and equal to or less than 10 μm,
   wherein the nano-oxide comprises spherical particles having a primary average particle diameter equal to or more than 10 nm and equal to or less than 100 nm,
   wherein a powder resistance value of the laminating and shaping copper powder is equal to or more than (7.50E+5) Ω and equal to or less than (2.50E+7) Ω, and
   wherein the laminating and shaping copper powder, when melted with energy from a laser, is shapable into an object having an electrical conductivity of at least 94.1% IACS.

2. The laminating and shaping copper powder according to claim 1, wherein the nano-oxide is $SiO_2$.

3. The laminating and shaping copper powder according to claim 1, wherein a flow rate of the laminating and shaping copper powder measured by JIS Z2502 is equal to or more than 15 sec/50 g and equal to or less than 120 sec/50 g.

* * * * *